US012784702B2

(12) United States Patent
Wu

(10) Patent No.: US 12,784,702 B2
(45) Date of Patent: Nov. 3, 2026

(54) BACKLIGHT MODULE CONTROL METHOD AND APPARATUS, AND DISPLAY MODULE AND STORAGE MEDIUM

(71) Applicants: Beijing BOE Technology Development Co., Ltd., Beijing (CN); BOE Technology Group Co., Ltd., Beijing (CN)

(72) Inventor: Congrui Wu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 19/469,385

(22) PCT Filed: May 27, 2024

(86) PCT No.: PCT/CN2024/095459

§ 371 (c)(1),
(2) Date: Sep. 26, 2025

(87) PCT Pub. No.: WO2024/245180

PCT Pub. Date: Dec. 5, 2024

(65) Prior Publication Data

US 2026/0237361 A1 Aug. 13, 2026

(30) Foreign Application Priority Data

Jun. 1, 2023 (CN) ......................... 202310646630.5

(51) Int. Cl.
*G09G 3/34* (2006.01)
*G09G 3/36* (2006.01)

(52) U.S. Cl.
CPC ......... *G09G 3/3426* (2013.01); *G09G 3/3611* (2013.01); *G09G 2320/0233* (2013.01);
(Continued)

(58) Field of Classification Search
CPC ........... G06F 3/147; G06T 2207/10016; G06T 2207/10024; G06T 2207/20221;
(Continued)

(56) References Cited

U.S. PATENT DOCUMENTS

2013/0016141 A1 1/2013 Chang et al.
2019/0311672 A1 10/2019 Jeong et al.
(Continued)

FOREIGN PATENT DOCUMENTS

CN 105118474 A 12/2015
CN 106228936 A 12/2016
(Continued)

OTHER PUBLICATIONS

International Search Report for PCT/CN2024/095459 Mailed Sep. 6, 2024.

*Primary Examiner* — Insa Sadio

(57) ABSTRACT

A backlight module control method and apparatus, and a display module and a storage medium, which relate to the field of display. The method comprises: under the condition of not changing system software and a drive, according to the number of horizontal image pixels and the number of vertical image pixels of an image to be displayed, the number of parallel scanning channels, and a number relationship between the number of horizontal backlight partitions and the number of vertical backlight partitions of a backlight module, determining a pixel partition corresponding to each backlight partition in said image (102); and according to a pixel value of each pixel in the pixel partition, determining backlight data of the backlight partition corresponding to the pixel partition (103).

19 Claims, 6 Drawing Sheets

(52) U.S. Cl.
CPC ................. *G09G 2320/062* (2013.01); *G09G 2320/0686* (2013.01); *G09G 2360/121* (2013.01)

(58) Field of Classification Search
CPC ........ G06T 2207/30204; G06T 7/0002; G09G 2320/0613; G09G 2320/0666; G09G 2320/08; G09G 2340/06; G09G 2354/00; G09G 5/14; H04N 5/265; H04N 7/01; H04N 21/234; C12Q 1/6806; C12Q 1/6809; C12Q 1/6837; C12Q 1/6874; C12Q 1/6886; C12Q 2600/156; C12Q 2600/158; G16B 20/20; G16B 40/00; G16H 10/40; G16H 50/30; G16H 50/50; G16H 50/70; G16H 70/60
See application file for complete search history.

(56) References Cited

U.S. PATENT DOCUMENTS

| | | | | |
|---|---|---|---|---|
| 2021/0390925 | A1* | 12/2021 | Ishihara ............... | G09G 3/2092 |
| 2022/0044647 | A1* | 2/2022 | Murai .................. | G09G 3/2022 |

FOREIGN PATENT DOCUMENTS

| | | | |
|---|---|---|---|
| CN | 112927654 | A | 6/2021 |
| CN | 116013209 | A | 4/2023 |

* cited by examiner

| | | |
|---|---|---|
| β | β | β |
| β | 1 | β |
| β | β | β |

FIG. 8

BACKLIGHT MODULE CONTROL METHOD AND APPARATUS, AND DISPLAY MODULE AND STORAGE MEDIUM

CROSS-REFERENCE TO RELATED APPLICATION

The present application is a U.S. National Phase Entry of International PCT Application No. PCT/CN2024/095459 having an international filing date of May 27, 2024, which claims priority to Chinese Patent Application No. 202310646630.5 filed on Jun. 1, 2023 and entitled “Backlight Module Control Method and Apparatus, Display Module and Storage Medium”. The above-identified applications are incorporated by reference herein in their entireties.

TECHNICAL FIELD

The present invention relates to the field of display, in particular to a method and apparatus for controlling a backlight module, a display module and a storage medium.

BACKGROUND

In a display module with a Mini Light Emitting Diode (MiniLED) as the backlight module, in order to achieve excellent display effect in contrast, High Dynamic Range Imaging (HDR), color and other display indicators, the backlight module can be divided into multiple backlight partitions, and each backlight partition can be controlled to light up through the backlight partition dimming method.

However, product differentiation leads to the emergence of various specifications of backlight partition modules, so it is needed to develop a dimming method for each specification of backlight modules separately, which leads to an increase in the development cycle and development costs of product development.

SUMMARY

The present invention provides a method and apparatus for controlling a backlight module, a display module and a storage medium, so as to solve the shortcomings in the related art.

According to a first aspect of an embodiment of the present invention, there is provided a method for controlling a backlight module, wherein the backlight module includes a plurality of backlight partitions, the method including: acquiring a number of horizontal image pixels and a number of vertical image pixels of an image to be displayed, a number of parallel scanning channels, and a number of horizontal backlight partitions and a number of vertical backlight partitions of the backlight module; determining a pixel partition corresponding to each backlight partition in the image to be displayed according to the number of horizontal image pixels, the number of vertical image pixels, the number of parallel scanning channels, and a quantitative relationship between the number of horizontal backlight partitions and the number of vertical backlight partitions; and determining backlight data of a backlight partition corresponding to the pixel partition according to pixel values of various pixels in the pixel partition.

In some embodiments, the pixel partition is determined according to a horizontal pixel partition and a vertical pixel partition. Said determining the pixel partition corresponding to each backlight partition in the image to be displayed according to the number of horizontal image pixels, the number of vertical image pixels, the number of parallel scanning channels, and the quantity relationship between the number of horizontal backlight partitions and the number of vertical backlight partitions, includes: determining a width of the horizontal pixel partition according to a multiple relationship between the number of horizontal image pixels as well as the number of parallel scanning channels and the number of horizontal backlight partitions, and determining a width of the vertical pixel partition according to a multiple relationship between the number of vertical image pixels and the number of vertical backlight partitions; determining an arrangement number of horizontal pixel partitions with different widths in a pixel row according to the number of horizontal image pixels, the number of parallel scanning channels, and the number of horizontal backlight partitions, and determining an arrangement number of vertical pixel partitions with different widths in a pixel column according to the number of vertical image pixels and the number of vertical backlight partitions; determining a horizontal arrangement sequence of the horizontal pixel partitions with different widths and a vertical arrangement sequence of the vertical pixel partitions with different widths; and determining the pixel partition corresponding to each backlight partition in the image to be displayed according to the horizontal arrangement sequence and the vertical arrangement sequence.

In some embodiments, said determining the width of the horizontal pixel partition according to the multiple relationship between the number of horizontal image pixels as well as the number of parallel scanning channels and the number of horizontal backlight partitions, and determining the width of the vertical pixel partition according to the multiple relationship between the number of vertical image pixels and the number of vertical backlight partitions, includes: if there is a non-integer multiple between the number of horizontal image pixels as well as the number of parallel scanning channels and the number of horizontal backlight partitions, determining a first horizontal width and a second horizontal width of the horizontal pixel partition using a rounding function according to the number of horizontal image pixels, the number of parallel scanning channels and the number of horizontal backlight partitions, wherein the first horizontal width and the second horizontal width are an integer number of clock cycles, and a difference between the first horizontal width and the second horizontal width is one clock cycle; if there is an integer multiple between the number of horizontal image pixels as well as the number of parallel scanning channels and the number of horizontal backlight partitions, determining a third horizontal width of the horizontal pixel partition according to the number of horizontal image pixels, the number of parallel scanning channels, and the number of horizontal backlight partitions, wherein the third horizontal width is an integer number of clock cycles; if there is a non-integer multiple between the number of vertical image pixels and the number of vertical backlight partitions, determining a first vertical width and a second vertical width of the vertical pixel partition using the rounding function according to the number of vertical image pixels and the number of vertical backlight partitions; if there is an integer multiple between the number of vertical image pixels and the number of vertical backlight partitions, determining a third vertical width of the vertical pixel partition according to the number of vertical image pixels and the number of vertical backlight partitions.

In some embodiments, said determining the first horizontal width and the second horizontal width of the horizontal pixel partition using the rounding function according to the number of horizontal image pixels, the number of parallel scanning channels, and the number of horizontal backlight partitions, includes: determining a number of scanning times in a horizontal image direction according to the multiple relationship between the number of horizontal image pixels and the number of parallel scanning channels; determining the first horizontal width of the horizontal pixel partition using a downward rounding function according to the number of scanning times in the horizontal image direction and the number of horizontal backlight partitions; and determining the second horizontal width of the horizontal pixel partition using an upward rounding function according to the number of scanning times in the horizontal image direction and the number of horizontal backlight partitions. Said determining the first vertical width and the second vertical width of the vertical pixel partition using the rounding function according to the number of vertical image pixels and the number of vertical backlight partitions, includes: determining the first vertical width of the vertical pixel partition using the downward rounding function according to the number of vertical image pixels and the number of vertical backlight partitions; and determining the second vertical width of the vertical pixel partition using the upward rounding function according to the number of vertical image pixels and the number of vertical backlight partitions.

In some embodiments, the horizontal pixel partition includes a first horizontal pixel partition and a second horizontal pixel partition, a width of the first horizontal pixel partition is a first horizontal width, and a width of the second horizontal pixel partition is a second horizontal width. Said determining the arrangement number of the horizontal pixel partitions with different widths in the pixel row according to the number of horizontal image pixels, the number of parallel scanning channels and the number of horizontal backlight partitions, includes: determining a difference between the number of scanning times in the horizontal image direction and a product of the second horizontal width and the number of horizontal backlight partitions as an arrangement number of the first horizontal pixel partition in the pixel row, wherein the number of scanning times in the horizontal image direction is determined according to the number of horizontal image pixels and the number of parallel scanning channels; and determining a difference between the number of horizontal backlight partitions and a product of the number of scanning times in the horizontal image direction and the first horizontal width as an arrangement number of the second horizontal pixel partition in the pixel row.

In some embodiments, the vertical pixel partition includes a first vertical pixel partition and a second vertical pixel partition, a width of the first vertical pixel partition is a first vertical width and a width of the second vertical pixel partition is a second vertical width. Said determining the arrangement number of the vertical pixel partitions with different widths in the pixel column according to the number of vertical image pixels and the number of vertical backlight partitions, includes: determining a difference between the number of vertical image pixels and a product of the second vertical width and the number of vertical backlight partitions as an arrangement number of the first vertical pixel partition in the pixel column; and determining a difference between the number of vertical image pixels and a product of the first vertical width and the number of vertical backlight partitions as an arrangement number of the second vertical pixel partition in the pixel column.

In some embodiments, the horizontal pixel partition includes a first horizontal pixel partition and a second horizontal pixel partition, the first horizontal pixel partition and the second horizontal pixel partition having different widths. Said determining the horizontal arrangement sequence of the horizontal pixel partitions with different widths, includes: determining an arrangement ratio according to a ratio of the arrangement number of the first horizontal pixel partition in the pixel row and the arrangement number of the second horizontal pixel partition in the pixel row; rounding down the arrangement ratio and then adding to a unit clock cycle to obtain an arrangement period; if the arrangement period is not equal to a set period, rounding down half of the arrangement ratio and then adding it to the unit clock cycle to obtain an arrangement half period, and if the arrangement period is equal to the set period, determining the unit clock cycle as the arrangement half period; utilizing the arrangement number of the first horizontal pixel partition in the pixel row to subtract a product of the arrangement ratio rounded down and the arrangement number of the second horizontal pixel partition in the pixel row to obtain an arrangement remainder; for each horizontal pixel partition, determining a position where a sequence number of a current horizontal pixel partition is located to arrange the first horizontal pixel partition or the second horizontal pixel partition according to a relationship between a sequence number of the horizontal pixel partition as well as a remainder of the arrangement period and the arrangement half period, and when a set condition is satisfied, arranging the first horizontal pixel partition at a position where a sequence number of a next horizontal pixel partition is located, wherein the set condition includes that the sequence number of the horizontal pixel partition and the remainder of the arrangement period are zero, and the sum of the arrangement remainder is greater than the arrangement number of the second horizontal pixel partition in the pixel row.

In some embodiments, said determining the position where the sequence number of the current horizontal pixel partition is located to arrange the first horizontal pixel partition or the second horizontal pixel partition according to the relationship between the sequence number of the horizontal pixel partition as well as the remainder of the arrangement period and the arrangement half period, includes: if the sequence number of the horizontal pixel partition and the remainder of the arrangement period are equal to the arrangement half period, determining the position where the horizontal pixel partition is located to arrange the second horizontal pixel partition; and if the sequence number of the horizontal pixel partition and the remainder of the arrangement period are not equal to the arrangement half period, determining the position where the horizontal pixel partition is located to arrange the first horizontal pixel partition.

In some embodiments, 0 is used to identify the first horizontal pixel partition and 1 is used to identify the second horizontal pixel partition in the horizontal arrangement sequence, and the method further includes: initializing a sequence with a set length and the sequence number of the horizontal pixel partition; if the sequence number of the horizontal pixel partition and the remainder of the arrangement period are equal to the arrangement half period, and the sequence is not padded for the first time, padding 1 at the highest bit of the sequence after the padded sequence is moved to a lower bit by a unit length; if the sequence number of the horizontal pixel partition and the remainder of the arrangement period are not equal to the arrangement half period, and the sequence is not padded for the first time, padding 0 at the highest bit of the sequence after the padded sequence is moved to the lower bit by the unit length; if the sequence number of the horizontal pixel partition and the remainder of the arrangement period are 0, and the sum of the arrangement remainder is greater than the arrangement number of the second horizontal pixel partition in the pixel row, padding 0 at the highest bit of the sequence, and updating the number of horizontal backlight partitions after the padded sequence is moved to the lower bit by the unit length; if the sequence number of the horizontal pixel partition is equal to an updated number of horizontal backlight partitions, shifting the padded valid bit to the lowest bit of the sequence to obtain the horizontal arrangement sequence.

In some embodiments, said determining the backlight data of the backlight partition corresponding to the pixel partition according to the pixel values of various pixels in the pixel partition, includes: obtaining a maximum pixel value and a pixel sum in the pixel partition according to the pixel values of various pixels in the pixel partition; determining a pixel average value according to a division quantization parameter of the pixel partition and the pixel sum; determining basic backlight data of the backlight partition corresponding to the pixel partition according to the maximum pixel value and the pixel average value and respective weights; filtering basic backlight data corresponding to all backlight partitions to obtain target backlight data of each backlight partition.

In some embodiments, the division quantization parameter is determined by: acquiring a maximum pixel number of the pixel partition in a horizontal direction and a maximum pixel number of the pixel partition in a vertical direction, wherein the maximum pixel number in the horizontal direction is determined according to a width of the pixel partition in the horizontal direction and the number of parallel scanning channels; determining a quantization bit according to the maximum pixel number in the horizontal direction and the maximum pixel number in the vertical direction; determining a division quantization parameter corresponding to the pixel partition according to the pixel number in the pixel partition and the quantization bit.

In some embodiments, the pixel partition includes different types of pixel partitions, wherein a first type of pixel partitions has a first horizontal width and a first vertical width, a second type of pixel partitions has a first horizontal width and a second vertical width, a third type of pixel partitions has a second horizontal width and a first vertical width, and a fourth type of pixel partitions has a second horizontal width and a second vertical width; if the type of the pixel partition is the first type, determining a first pixel number in the first type of pixel partitions according to the first horizontal width and the first vertical width, and determining a first division quantization parameter corresponding to the first type of pixel partitions according to the first pixel number and the quantization bit; if the type of the pixel partition is the second type, determining a second pixel number in the second type of pixel partitions according to the first horizontal width and the second vertical width, and determining a second division quantization parameter corresponding to the second type of pixel partitions according to the second pixel number and the quantization bit; if the type of the pixel partition is the third type, determining a third pixel number in the third type of pixel partitions according to the second horizontal width and the first vertical width, and determining a third division quantization parameter corresponding to the third type of pixel partitions according to the third pixel number and the quantization bit; if the type of the pixel partition is the fourth type, determining a fourth pixel number in the fourth type of pixel partitions according to the second horizontal width and the second vertical width, and determining a fourth division quantization parameter corresponding to the fourth type of pixel partitions according to the fourth pixel number and the quantization bit.

In some embodiments, each pixel in the pixel partition corresponds to a plurality of counters, the counters including: a clock number counter in the horizontal pixel partition, a pixel row number counter in the vertical pixel partition, a horizontal pixel partition number counter, and a vertical pixel partition number counter. The method further includes: updating the clock number counter in the horizontal pixel partition when a data enable signal is received, and resetting the clock number counter in the horizontal pixel partition when a value corresponding to the clock number counter in the horizontal pixel partition is equal to the width of the horizontal pixel partition; updating the horizontal pixel partition number counter when the clock number counter in the horizontal pixel partition is reset, and resetting the horizontal pixel partition number counter when a value corresponding to the horizontal pixel partition number counter is equal to the number of horizontal backlight partitions; updating the pixel row number counter in the vertical pixel partition when the horizontal pixel partition number counter is reset, and resetting the pixel row number counter in the vertical pixel partition when a value corresponding to the pixel row number counter in the vertical pixel partition is equal to a pixel row number in the vertical pixel partition; updating the vertical pixel partition number counter when the pixel row number counter in the vertical pixel partition is rest, and resetting the vertical pixel partition number counter when a value corresponding to the vertical pixel partition number counter is equal to the number of vertical backlight partitions.

In some embodiments, the width of the horizontal pixel partition is determined by: obtaining the lowest bit of a horizontal arrangement sequence; if a value corresponding to the lowest bit is 0, the width of the horizontal pixel partition is a first horizontal width; if the value corresponding to the lowest bit is 1, the width of the horizontal pixel partition is a second horizontal width; when the clock number counter in the horizontal pixel partition is reset, the horizontal arrangement sequence is shifted to the right by 1 bit.

In some embodiments, said obtaining the maximum pixel value and the pixel sum in the pixel partition according to the pixel values of various pixels in the pixel partition, includes: in the process of scanning the image to be displayed, determining a target pixel partition to which a currently scanned pixel belongs according to the horizontal pixel partition number counter and the vertical pixel partition number counter corresponding to the currently scanned pixel; obtaining a candidate maximum pixel value and a candidate pixel sum from a storage area corresponding to the target pixel partition; if a pixel value corresponding to the currently scanned pixel is greater than the candidate maximum pixel value, updating the candidate maximum pixel value as the pixel value corresponding to the currently scanned pixel; updating the candidate pixel sum with the pixel value corresponding to the currently scanned pixel.

In some embodiments, said filtering the basic backlight data corresponding to all backlight partitions to obtain the target backlight data of each backlight partition, includes: performing a padding operation on the basic backlight data corresponding to all backlight partitions; filtering the basic backlight data after the padding operation using a preset filtering kernel to obtain target backlight data of each backlight partition, wherein a number of filtering times of each row of basic backlight data is determined according to the number of horizontal backlight partitions, and a number of rows where filtering is executed is determined according to the number of vertical backlight partitions.

In some embodiments, the method further includes: caching the image to be displayed to a video frame buffer device; and controlling the backlight data of all backlight partitions to be output synchronously with the image to be displayed when the backlight data of all backlight partitions is acquired.

According to a second aspect of an embodiment of the present invention, there is provided an apparatus for controlling a backlight module, wherein the backlight module includes a plurality of backlight partitions, and the apparatus includes: an acquisition unit for acquiring a number of horizontal image pixels and a number of vertical image pixels of an image to be displayed, a number of parallel scanning channels, and a number of horizontal backlight partitions and a number of vertical backlight partitions of the backlight module; a calculation unit for determining a pixel partition corresponding to each backlight partition in the image to be displayed according to the number of horizontal image pixels, the number of vertical image pixels, the number of parallel scanning channels, and a quantitative relationship between the number of horizontal backlight partitions and the number of vertical backlight partitions, and determining backlight data of a backlight partition corresponding to the pixel partition according to the pixel values of various pixels in the pixel partition.

According to a third aspect of an embodiment of the present invention, there is provided a display module including: a display panel and a backlight module; the backlight module being controlled by the method of any one of the above.

According to a fourth aspect of an embodiment of the present invention, there is provided a storage medium storing computer instructions for causing a computer to execute the method of any one of the above.

According to the above embodiments, without changing system software and a drive, the backlight data of the backlight partition is updated in real time according to the number of horizontal image pixels and the number of vertical image pixels of the image to be displayed, the number of parallel scanning channels, and the number of horizontal backlight partitions and the number of vertical backlight partitions of the backlight module to adapt to a plurality of backlight modules with different backlight partition specifications.

It should be understood that the above general description and following detailed description are exemplary and explanatory only, and are not intended to limit the present invention.

BRIEF DESCRIPTION OF DRAWINGS

The accompanying drawings here are incorporated in the specification and constitute a part of the specification, illustrate the embodiments conforming to the present invention, and together with the specification, are used for explaining the principle of the present invention.

FIG. 8 is a schematic diagram of a filter kernel according to an embodiment of the present invention.

DETAILED DESCRIPTION

Exemplary embodiments will be described in detail here, and their examples are shown in the accompanying drawings. When the following description refers to the drawings, unless otherwise indicated, a same number in different drawings indicates a same or similar element. The embodiments described in following exemplary embodiments do not represent all embodiments according to the present invention. In contrast, they are merely examples of apparatuses and methods consistent with some aspects of the invention as detailed in the appended claims.

A display module includes a display panel and a backlight module, wherein the display panel can be a Liquid Crystal Display (LCD), and the backlight module can be a MiniLED. In order to obtain a better display effect, the backlight module can be divided into a plurality of backlight partitions, and the backlight partitions can be controlled to light up one by one.

In the product research and development phase, a variety of backlight partitions with different specifications will be developed. When the MiniLED backlight of the display module is replaced, the backlight partitions with different specifications cause a local dimming module in a display system to be incompatible and adaptable. Usually, development work is required for novel backlight modules, but this method can neither achieve rapid iterative upgrades of products nor effectively control project development costs.

In view of this, the present invention provides a method for controlling a backlight module, wherein the calculation logic of the method is modified according to basic parameter information input in real time to adapt to a plurality of display modules with different backlight partition specifications, thereby improving the development efficiency, shortening the development cycle and reducing the development costs. The basic parameter information includes a number of horizontal image pixels and a number of vertical image pixels, a number of parallel scanning channels, and a number of horizontal backlight partitions and a number of vertical backlight partitions of the backlight module.

The following examples will explain the present invention with reference to the accompanying drawings.

Figure 1:
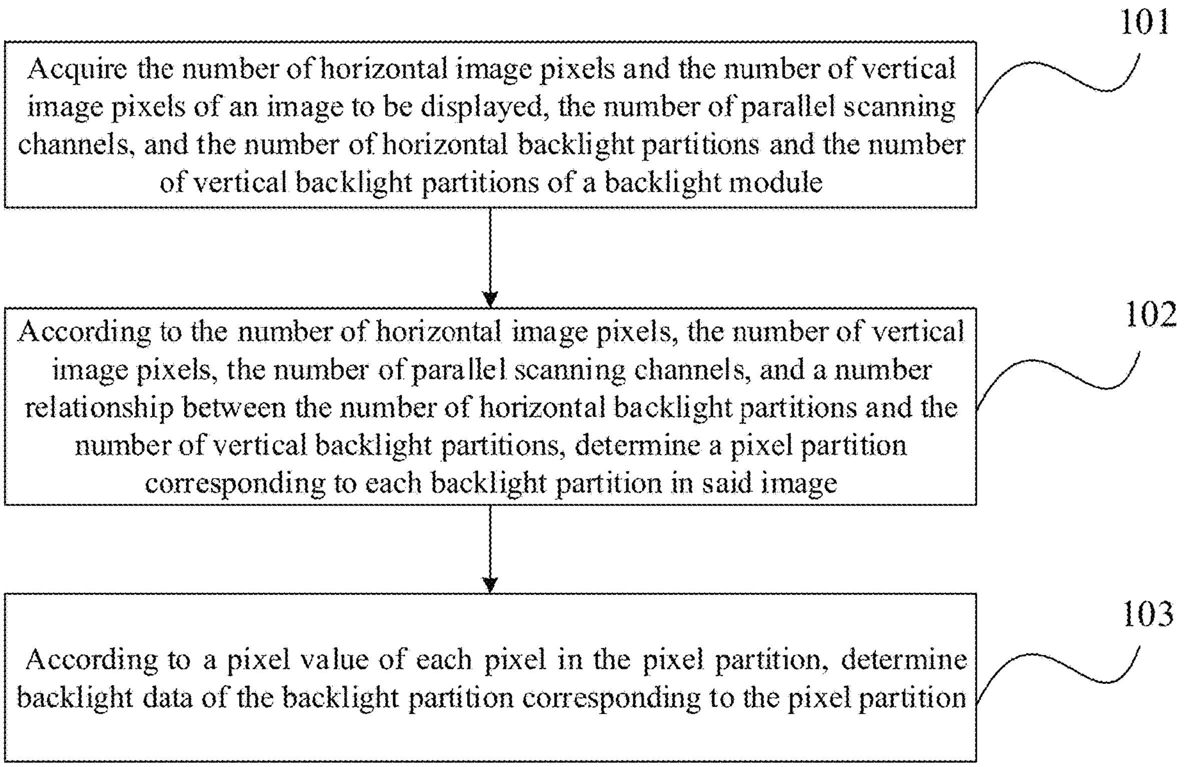
FIG. 1 is a flowchart of a method for controlling a backlight module according to an embodiment of the present invention.

FIG. 1 is a flowchart of a method for controlling a backlight module according to an embodiment of the present invention, and as shown in FIG. 1, the method for controlling the backlight module includes the following steps 101 to 103.

In step 101, the number of horizontal image pixels and the number of vertical image pixels of the image to be displayed, the number of parallel scanning channels, and the number of horizontal backlight partitions and the number of vertical backlight partitions of the backlight module are acquired.

In order to control backlight modules with different specifications, the present invention acquires the above basic parameter information through a designated interface before determining backlight data. The specification of the backlight module, for example, 120*85, 64*90, 110*90, etc., can be determined according to the number of horizontal backlight partitions and the number of vertical backlight partitions in the basic parameter information. Herein, the number of horizontal image pixels and the number of vertical image pixels can be determined by a video resolution.

In one embodiment, a range of respective parameters in the input basic parameter information can be limited in consideration of the actual usage scenario and the actual hardware resource costs. For example, it can be defined that the video input resolution supports 2K/4K/8K@60 HZ; the number of parallel scanning channels is between 1 and 16; and the number of horizontal backlight partitions and the number of vertical backlight partitions are between 1 and 120, respectively.

In step 102, a pixel partition corresponding to each backlight partition in the image to be displayed is determined according to the number of horizontal image pixels, the number of vertical image pixels, the number of parallel scanning channels, and a quantitative relationship between the number of horizontal backlight partitions and the number of vertical backlight partitions.

The pixel partition in the image to be displayed includes two dimensions of a horizontal direction and a vertical direction, and in the present embodiment, the pixel partition is referred to as a horizontal pixel partition in the horizontal direction, and the pixel partition is referred to as a vertical pixel partition in the vertical direction.

The pixel partitions in the image to be displayed are in one-to-one correspondence with the backlight partitions, thus the number of horizontal backlight partitions is equal to the number of horizontal pixel partitions, and the number of vertical backlight partitions is equal to the number of vertical pixel partitions. The width of the horizontal pixel partition can be determined according to the quantitative relationship between the number of horizontal image pixels as well as the number of parallel scanning channels and the number of horizontal backlight partitions; and the width of the vertical pixel partition can be determined according to the multiple relationship between the number of image vertical pixels and the number of vertical backlight partitions.

In the case of determining the number of horizontal pixel partitions and the width of the horizontal pixel partition, and the number of vertical pixel partitions and the width of the vertical pixel partition, the specification of the pixel partitions in the image to be displayed can be determined. The corresponding relationship between each pixel partition in the image to be displayed and the backlight partition in the backlight module is then established, that is, the pixel partition corresponding to each backlight partition in the image to be displayed is determined.

In step 103, backlight data of a backlight partition corresponding to the pixel partition is determined according to the pixel values of various pixels in the pixel partition.

Through the above steps, it can be seen that the present invention can modify the basic parameter information through the designated interface when the display module is running, and determine the backlight data of each backlight partition according to the modified basic parameter information, and can be adapted to and compatible with the backlight partitions of different sizes in real time without changing the system software and drive, thereby reducing the development cycle and development costs of the display module product based on the MiniLED partition backlight.

In some embodiments, said determining the backlight data of the backlight partition corresponding to the pixel partition according to the pixel values of various pixels in the pixel partition can include: obtaining a maximum pixel value and a pixel sum in the pixel partition according to the pixel values of various pixels in the pixel partition; determining a pixel average value according to a division quantization parameter of the pixel partition and the pixel sum; determining basic backlight data of the backlight partition corresponding to the pixel partition according to the maximum pixel value and the pixel average value and respective weights; filtering basic backlight data corresponding to all backlight partitions to obtain target backlight data of each backlight partition.

Because backlight calculation needs to be output only after the transmission of a complete frame of image is completed, backlight will lag behind the image by one frame, resulting in issues of inaccurate pixel compensation and asynchronous display of the image and backlight. Therefore, frame buffer is performed on the image to be displayed to ensure that the image to be displayed and the backlight data used for pixel compensation keep synchronous, so as to obtain more accurate and better synchronous backlight control effect. That is, the method further includes: caching the image to be displayed to a video frame buffer device; controlling the backlight data of all backlight partitions to be output synchronously with the image to be displayed when the backlight data of all backlight partitions is acquired.

Figure 2:
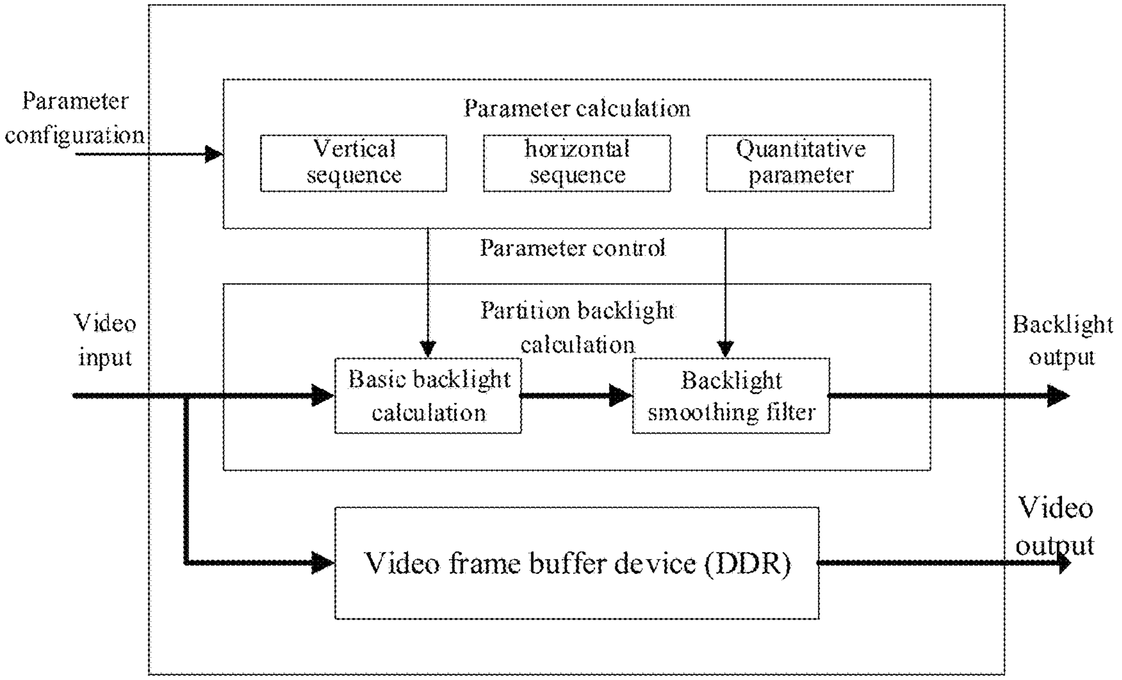
FIG. 2 is an architecture diagram of a method for controlling a backlight module according to an embodiment of the present invention.

FIG. 2 is an architecture diagram of a method for controlling a backlight module according to an embodiment of the present invention. As shown in FIG. 2, the complete control process of the present invention can be divided into a parameter calculation portion, a partition backlight calculation portion and a video synchronization portion.

In the parameter calculation portion, derived parameters required for generating the partition backlight calculation portion are calculated according to the currently input basic parameter information. The derived parameters include width information of the horizontal pixel partition, width information of the vertical pixel partition, a division quantization parameter, a quantization bit, a horizontal arrangement sequence, and a vertical arrangement sequence.

The partition backlight calculation portion includes a basic backlight calculation portion and a backlight smoothing filtering portion. In the basic backlight calculation portion: basic backlight data of the pixel partition corresponding to the backlight partition is extracted from the image to be displayed according to an arrangement mode of the backlight partition, and the basic backlight data can be determined by weighting calculation using a mean algorithm and a maximum algorithm. In the backlight smoothing filtering portion: a set filter kernel is used for smooth filtering, obtaining target backlight data that can be output and displayed.

In the video synchronization portion, the image to be displayed is cached. In the present embodiment, a Double Data Rate (DDR) Synchronous Dynamic Random Access Memory may be used as a video frame buffer device.

Those skilled in the art should appreciate that the video data and the image to be displayed express the same meaning in this embodiment.

In the process of controlling the backlight module in the present invention, the changes in basic parameters include a size (resolution) of video data, a video data transmission rate (the number of parallel scanning channels), and a number of pixels in each backlight partition, etc. The control method is usually realized by FPGA (Field Programmable Gate Array), which will affect the FPGA implementation architecture due to the characteristics of FPGA fixed-point calculation and the computational structure of algorithm circuit solidification. Therefore, in the implementation using FPGA, the following optimization design can be carried out for the algorithm:

1. Analyzing the basic parameters and summarizing the parameters of the subsequent calculation module to obtain the derived parameter data.

Before calculating the basic backlight data of the pixel partition, the derived parameters used in the control process are obtained in advance according to the basic parameters of the backlight specification and the video specification, which can reduce the calculation complexity inside the partition backlight calculation portion and improve the efficiency and speed of the video and backlight calculation. That is to say, all parameter calculations in the parameter calculation portion are made in advance at a frame start stage (i.e., a blank period between frames), which can avoid the non-real-time performance caused by a high delay of a divider, and the derived parameters can be directly used for calculation at a pixel transmission stage to ensure the real-time performance of calculation.

For users, video data with different resolutions within a set range and backlight partition information with different arrangement specifications can be input, and the above basic parameter information can also be modified during operation. The FPGA completes the calculation of the derived parameters at the frame start stage, and uses the derived parameters for control at the pixel transmission stage.

2. Adopting a computing architecture adapted to the highest amount of video data, and achieving backward compatibility of data calculation through parameter control.

For example, the RAM instantiation size is implemented as a maximum partition case (120*120).

3. Dynamically adjusting a sequence flag bit and a pixel counter when the externally input basic parameters change.

There are specifically included adopting a horizontal arrangement sequence to identify the width of the horizontal pixel partition, adopting a vertical arrangement sequence to identify the width of the vertical pixel partition, and adopting four counters to determine the pixel partition to which the currently scanned pixel belongs, and the horizontal arrangement sequence and the vertical arrangement sequence are dynamically adjusted when the externally input basic parameters change. The number of horizontal backlight partitions and the number of vertical backlight partitions in the basic parameters, as well as the dynamic adjustment of the horizontal arrangement sequence and the vertical arrangement sequence will affect a value range of different counters, thereby affecting the pixel partition to which the currently scanned pixel belongs.

The following embodiments will specifically explain the computational logic of each portion described above.

In some embodiments, said determining the pixel partition corresponding to each backlight partition in the image to be displayed according to the number of horizontal image pixels, the number of vertical image pixels, the number of parallel scanning channels, and the quantitative relationship between the number of horizontal backlight partitions and the number of vertical backlight partitions, may include the following steps 1021 to 1024.

In step 1021, the width of the horizontal pixel partition is determined according to the multiple relationship between the number of horizontal image pixels as well as the number of parallel scanning channels and the number of horizontal backlight partitions, and the width of the vertical pixel partition is determined according to the multiple relationship between the number of vertical image pixels and the number of vertical backlight partitions.

Since video data transmission is propagated in parallel according to a plurality of (e.g., N) channels per clock cycle, in order to reduce the computational volume, when backlight partitions are divided, clock counting serves as a segmentation unit in the horizontal direction, i.e., the width of each backlight partition in the horizontal direction is KH clock cycles; pixels serve as a segmentation unit in the vertical direction, i.e., the width of each backlight partition in the vertical direction is KV pixel rows. Herein, N is the number of parallel scanning channels, and N∈1-16. When the width of the pixel partition in the horizontal direction and the width of the pixel partition in the vertical direction are determined, it can be discussed on a case-by-case basis according to the image resolution and whether the backlight partition is divisible.

In the horizontal direction, according to the multiple relationship between the number of horizontal image pixels as well as the number of parallel scanning channels and the number of backlight horizontal partitions, the width of the horizontal pixel partition can be divided into the following two cases:

In the first case, if there is a non-integer multiple between the number of horizontal image pixels as well as the number of parallel scanning channels and the number of horizontal backlight partitions, the first horizontal width and the second horizontal width of the horizontal pixel partition are determined using a rounding function according to the number of horizontal image pixels, the number of parallel scanning channels, and the number of horizontal backlight partitions. Herein, the first horizontal width and the second horizontal width are an integer number of clock cycles.

In the second case, if there is an integer multiple between the number of horizontal image pixels as well as the number of parallel scanning channels and the number of horizontal backlight partitions, the third horizontal width of the horizontal pixel partition is determined according to the number of horizontal image pixels, the number of parallel scanning channels, and the number of horizontal backlight partitions. Herein, the third horizontal width is an integer number of clock cycles.

That is to say, in the case where the number of horizontal image pixels and the number of horizontal backlight partitions are numerically indivisible, in order to prevent the width of each horizontal pixel partition from being a non-integer numerical value, the width of the horizontal pixel partition is divided into two cases where the width difference is 1, that is, the first horizontal width and the second horizontal width differ by one clock cycle. In the case where the number of horizontal image pixels and the number of horizontal backlight partitions are numerically divisible, the width of each horizontal pixel partition is an integer number of clock cycles.

Similarly, in the vertical direction, according to the multiple relationship between the number of vertical image pixels and the number of vertical backlight partitions, the width of the vertical pixel partition can also include the following two cases:

In the first case, if there is a non-integer multiple between the number of vertical image pixels and the number of vertical backlight partitions, the first vertical width and the second vertical width of the vertical pixel partition are determined using the rounding function according to the number of vertical image pixels and the number of vertical backlight partitions.

In the second case, if there is an integer multiple between the number of vertical image pixels and the number of vertical backlight partitions, the third vertical width of the vertical pixel partition is determined according to the number of vertical image pixels and the number of vertical backlight partitions.

That is to say, in the case where the number of vertical image pixels and the number of vertical backlight partitions are numerically indivisible, in order to prevent the width of each vertical pixel partition from being a non-integer numerical value, the width of the vertical pixel partition is divided into two cases where the width difference is 1, that is, the first vertical width and the second vertical width differ by one pixel row. In the case where the number of vertical image pixels and the number of vertical backlight partitions are numerically divisible, the width of each vertical pixel partition is an integer number of pixel rows.

In the present embodiment, said determining the first horizontal width and the second horizontal width of the horizontal pixel partition using the rounding function according to the number of horizontal image pixels, the number of parallel scanning channels, and the number of horizontal backlight partitions can include: determining a number of scanning times in a horizontal image direction according to the multiple relationship between the number of horizontal image pixels and the number of parallel scanning channels; determining the first horizontal width of the horizontal pixel partition using a downward rounding function according to the number of scanning times in the horizontal image direction and the number of horizontal backlight partitions; and determining the second horizontal width of the horizontal pixel partition using an upward rounding function according to the number of scanning times in the horizontal image direction and the number of horizontal backlight partitions.

In the present embodiment, said determining the first vertical width and the second vertical width of the vertical pixel partition using the rounding function according to the number of vertical image pixels and the number of vertical backlight partitions can include:

- determining the first vertical width of the vertical pixel partition using the downward rounding function according to the number of vertical image pixels and the number of vertical backlight partitions; and determining the second vertical width of the vertical pixel partition using the upward rounding function according to the number of vertical image pixels and the number of vertical backlight partitions.

In Example 1, the present embodiment takes the resolution of the image to be displayed being 4K, i.e., the number of horizontal image pixels is 4096 and the number of vertical image pixels is 2160, the backlight partition being 120*85, i.e., the number of horizontal backlight partitions is 120 and the number of vertical backlight partitions is 85, and the number of parallel scanning channels being 8 as an example, said determining the width of the pixel partition is described.

Since the number of horizontal image pixels 4096 and the number of horizontal backlight partitions 120 are not divisible, in this example, there are horizontal pixel partitions with two widths. In consideration of clock cycles as the segmentation unit in the horizontal direction, it is possible to calculate the number of scanning times in the horizontal image direction according to Formula 1, determine the first horizontal width of the pixel horizontal partition using the downward rounding function according to Formula 2, and then determine the second horizontal width of the pixel horizontal partition using the upward rounding function according to Formula 3.

$$VDCLKH=VDHAC/VDCHNL \quad \text{Formula 1}$$

$$KH1=Floor(VDCLKH/BLHAC) \quad \text{Formula 2}$$

$$KH2=Ceil(VDCLKH/BLHAC) \quad \text{Formula 3}$$

Herein, VDCLKH is the number of scanning times in the horizontal image direction, VDHAC is the number of horizontal image pixels, VDCHNL is the number of parallel scanning channels, KH1 is the first horizontal width of the horizontal pixel partition, KH2 is the second horizontal width of the horizontal pixel partition, BLHAC is the number of horizontal backlight partitions, Floor ( ) is the downward rounding function, and Ceil ( ) is the upward rounding function.

Through the above calculation, it can be determined that the first horizontal width KH1 is 4, i.e., 32 pixel columns are included in the horizontal pixel partition in this case, and that the second horizontal width KH2 is 5, i.e., 40 pixel columns are included in the horizontal pixel partition in this case.

Since the number of vertical image pixels 2160 and the number of vertical backlight partition 85 are not divisible, in this example, there are also vertical pixel partitions with two widths. In this case, the first vertical width of the vertical pixel partition can be determined using the downward rounding function according to Formula 4, and then the second vertical width of the vertical pixel partition can be determined using the upward rounding function according to Formula 5.

$$KV1=Floor((VDVAC)/BLVAC) \quad \text{Formula 4}$$

$$KV2=Ceil((VDVAC)/BLVAC) \quad \text{Formula 5}$$

Herein, KV1 is the first vertical width of the vertical pixel partition, KV2 is the second vertical width of the vertical pixel partition, VDVAC is the number of vertical image pixels, and BLVAC is the number of vertical backlight partitions.

Through the above calculation, it can be determined that the first vertical width KV1 is 25, that is, 25 pixel rows are included in the vertical pixel partition in this case, and that the second vertical width KV2 is 26, that is, 26 pixel rows are included in the vertical pixel partition in this case.

Example 2 takes the resolution of the image to be displayed being 4K, i.e. the number of horizontal image pixels is 4096 and the number of vertical image pixels is 2160, the backlight partition being 120*90, i.e., the number of horizontal backlight partitions is 120 and the number of vertical backlight partitions is 90, and the number of parallel scanning channels being 8 as an example, wherein the number of vertical image pixels 2160 and the number of vertical backlight partition 90 are divisible in this case, the vertical pixel partition only has one width in the vertical direction, i.e., 24 pixel rows are included in each vertical pixel partition.

In Example 1, the number of horizontal image pixels and the number of horizontal backlight partitions, as well as the number of vertical image pixels and the number of vertical backlight partitions are not divisible, and in Example 2, the number of horizontal image pixels and the number of horizontal backlight partitions are not divisible, but the number of vertical image pixels and the number of vertical backlight partitions are divisible. In practical applications, there will be four cases of mutual combination, with the same calculation principle, which are not repeated here.

According to step 1021, it can be seen that there are two cases that the number of horizontal image pixels and the number of horizontal backlight partitions are divisible and indivisible, wherein in the divisible case, the horizontal pixel partition only has one width, and the number of horizontal pixel partitions with this width is equal to the number of horizontal backlight partitions; and in the indivisible case, the horizontal pixel partition has two widths, and the corresponding number of horizontal pixel partitions with each width can be determined according to step 1022. Similarly, the corresponding number of vertical pixel partitions with each width in the vertical direction can also be determined.

In step 1022, an arrangement number of horizontal pixel partitions with different widths in a pixel row is determined according to the number of horizontal image pixels, the number of parallel scanning channels, and the number of horizontal backlight partitions, and an arrangement number of vertical pixel partitions with different widths in a pixel column is determined according to the number of vertical image pixels and the number of vertical backlight partitions.

For convenience of description, the horizontal pixel partition with the first horizontal width is referred to as a first horizontal pixel partition, the horizontal pixel partition with the second horizontal width is referred to as a second horizontal pixel partition, the vertical pixel partition with the first vertical width is referred to as a first vertical pixel partition, and the vertical pixel partition with the second vertical width is referred to as a second vertical pixel partition.

In order to obtain the arrangement number of the first horizontal pixel partition and the arrangement number of the second horizontal pixel partition, an equation can be constructed according to known conditions, as shown in Formula 6, and then the arrangement number of the first horizontal pixel partition and the arrangement number of the second horizontal pixel partition can be solved. There are specifically included constructing an equation according to the sum of the arrangement number of the first horizontal pixel partition and the arrangement number of the second horizontal pixel partition being equal to the number of horizontal backlight partitions, the sum of the arrangement number of the first horizontal pixel partition multiplied by the width of the first horizontal pixel partition and the arrangement number of the second horizontal pixel partition multiplied by the width of the second horizontal pixel partition being equal to the number of scanning times in the horizontal image direction, and the difference between the width of the first horizontal pixel partition and the width of the second horizontal pixel partition being equal to 1. The arrangement number of the first horizontal pixel partition and the arrangement number of the second horizontal pixel partition can be obtained by solving the equation.

$$\begin{cases} KH1*xH+KH2*yH=VDCLKH \\ xH+yH=BLHAC \\ KH1-KH2=1 \end{cases} \quad \text{Formula 6}$$

In Formula 6, xH is the arrangement number of the first horizontal pixel partition, and yH is the arrangement number of the second horizontal pixel partition.

In the present embodiment, said determining the arrangement number of the horizontal pixel partitions with different widths in the pixel row according to the number of horizontal image pixels, the number of parallel scanning channels, and the number of horizontal backlight partitions can include: determining a difference between the number of scanning times in the horizontal image direction and a product of the second horizontal width and the number of horizontal backlight partitions as an arrangement number of the first horizontal pixel partition in the pixel row; determining a difference between the number of horizontal backlight partitions and a product of the number of scanning times in the horizontal image direction and the first horizontal width as an arrangement number of the second horizontal pixel partition in the pixel row, wherein the number of scanning times in the horizontal image direction is determined according to the number of horizontal image pixels and the number of parallel scanning channels.

Formula 6 is deformed to obtain Formula 7, and the arrangement number of the first horizontal pixel partition and the arrangement number of the second horizontal pixel partition are determined according to Formula 7.

$$\begin{cases} xH=KH2*BLHAC-VDCLKH \\ yH=VDCLKH-KH1*BLHAC \end{cases} \quad \text{Formula 7}$$

Following the above Example 1, it can be obtained using Formula 7 that the arrangement number xH of the first horizontal pixel partition is 88, and the arrangement number yH of the second horizontal pixel partition is 32.

Similarly, said determining the arrangement number of the vertical pixel partitions with different widths in the pixel column according to the number of vertical image pixels and the number of vertical backlight partitions can include: determining a difference between the number of vertical image pixels and a product of the second vertical width and the number of vertical backlight partitions as an arrangement number of the first vertical pixel partition in the pixel column; determining a difference between the number of vertical image pixels and a product of the first vertical width and the number of vertical backlight partitions as an arrangement number of the second vertical pixel partition in the pixel column.

In the present embodiment, the arrangement number of the first vertical pixel partition and the arrangement number of the second vertical pixel partition can be determined by Formula 8.

$$\begin{cases} xH=KV2*BLVAC-VDVAC \\ yH=VDCVAC-KV1*BLVAC \end{cases} \quad \text{Formula 8}$$

In Formula 8, xV is the arrangement number of the first vertical pixel partition, and yV is the arrangement number of the second vertical pixel partition.

After obtaining the arrangement number of the horizontal pixel partitions with different widths in the horizontal direction according to step 1022, in order to uniformly partition the first horizontal pixel partition and the second horizontal pixel partition in the horizontal direction, it is needed to determine the horizontal arrangement sequence SEQH of the horizontal pixel partitions with different widths; similarly, after obtaining the arrangement number of the vertical pixel partitions with different widths in the vertical direction, in order to uniformly partition the first vertical pixel partition and the second vertical pixel partition in the vertical direction, it is needed to determine the horizontal arrangement sequence SEQV of the vertical pixel partitions with different widths.

In step 1023, a horizontal arrangement sequence of horizontal pixel partitions with different widths and a vertical arrangement sequence of vertical pixel partitions with different widths are determined.

In the present embodiment, said determining the horizontal arrangement sequence of the horizontal pixel partitions with different widths can include:

- determining an arrangement ratio according to a ratio of the arrangement number of the first horizontal pixel partitions in the pixel row and the arrangement number of the second horizontal pixel partitions in the pixel row;
- rounding down the arrangement ratio and then adding it to a unit clock cycle to obtain an arrangement period;
- if the arrangement period is not equal to a set period, rounding down half of the arrangement ratio and then adding it to the unit clock cycle to obtain an arrangement half period, and if the arrangement period is equal to the set period, determining the unit clock cycle as the arrangement half period;
- utilizing the arrangement number of the first horizontal pixel partition in the pixel row to subtract a product of the arrangement ratio rounded down and the arrangement number of the second horizontal pixel partition in the pixel row to obtain an arrangement remainder;
- for each horizontal pixel partition, determining a position where a sequence number of a current horizontal pixel partition is located to arrange the first horizontal pixel partition or the second horizontal pixel partition according to a relationship between a sequence number of the horizontal pixel partition as well as a remainder of the arrangement period and the arrangement half period, and when a set condition is satisfied, arranging the first horizontal pixel partition at a position where a sequence number of a next horizontal pixel partition is located, wherein the set condition includes that the sequence number of the horizontal pixel partition and the remainder of the arrangement period are zero, and the sum of the arrangement remainder is greater than the arrangement number of the second horizontal pixel partition in the pixel row.

In the present embodiment, the arrangement ratio can be determined by Formula 9, the arrangement period can be determined by Formula 10, and then the arrangement half period can be determined by Formula 11, and finally the arrangement remainder can be determined by Formula 12.

$$zh = \frac{xH}{yH} \qquad \text{Formula 9}$$

$$Th = \text{floor}(zh) + 1 \qquad \text{Formula 10}$$

$$Th_{half} = \begin{cases} \text{floor}\left(\frac{Th}{2}\right) + 1 & Th \neq 2 \\ 1 & Th = 2 \end{cases} \qquad \text{Formula 11}$$

$$rmdh = xH - \text{floor}(zh) * yH \qquad \text{Formula 12}$$

In the above formulas, zh is the arrangement ratio, Th is the arrangement period, $Th_{half}$ is the arrangement half period, and rmdh is the arrangement remainder.

In the present embodiment, said determining the position where the current horizontal pixel partition sequence number is located to arrange the first horizontal pixel partition or the second horizontal pixel partition according to the relationship between the sequence number of the horizontal pixel partition as well as the remainder of the arrangement period and the arrangement half period, can include:

- if the sequence number of the horizontal pixel partition and the remainder of the arrangement period are equal to the arrangement half period, determining the position where the horizontal pixel partition is located to arrange the second horizontal pixel partition;
- if the sequence number of the horizontal pixel partition and the remainder of the arrangement period are not equal to the arrangement half period, determining the position where the horizontal pixel partition is located to arrange the first horizontal pixel partition.

In the indivisible case, the size of the horizontal pixel partition in the horizontal direction includes two cases. In the case where the arrangement number of the first horizontal pixel partition is greater than the arrangement number of the second horizontal pixel partition, i.e., xH>yH, it can be defined that '0' is used to identify the first horizontal pixel partition with a width being the first horizontal width KH1 and '1' is used to identify the second horizontal pixel partition with a width being the second horizontal width KH2 in the horizontal arrangement sequence SEQH. At the same time, according to the total number of horizontal pixel partitions, it can be determined that the horizontal arrangement sequence SEQH is 120 at most, so the horizontal arrangement sequence can be initialized to 120 bits of '0'.

The following takes the calculation of the horizontal arrangement sequence as an example, and in the following example, the arrangement of each horizontal pixel partition is calculated by counting i from 1 to the number of horizontal backlight partitions BLHAC, and counting j from 0 to the number of horizontal backlight partitions BLHAC−1, wherein i is the sequence number of the horizontal pixel partition, and j is the sequence number of the horizontal arrangement sequence.

The result of the count i mod Th is judged, and '0' or '1' is selected for sequence padding according to the value of the remainder thereof.

1. In the case of mod(i,Th)=$Th_{half}$, the j-th bit of the horizontal arrangement sequence SEQH is padded with '1'.
2. In the case of mod(i,Th)=other values, the j-th bit of the horizontal arrangement sequence SEQH is padded with '0∝'.
3. In the case of mod(i,Th)=other values and mod(i,Th)=0, the arrangement remainder is accumulated according to $rmdh_{cnt}$=$rmdh_{cnt}$+rmdh to obtain an arrangement remainder accumulative sum $rmdh_{cnt}$, wherein the initial value of $rmdh_{cnt}$ is equal to 0, and it is further judged whether there is a need to additionally pad bits according to the value of the arrangement remainder accumulative sum $rmdh_{cnt}$:

If $rmdh_{cnt} \geq yH$, there is a need to additionally pad bits, i.e., '0' is padded at the j+1-th bit of the horizontal arrangement sequence SEQH, and $rmdh_{cnt}$ is corrected according to $rmdh_{cnt}=rmdh_{cnt}-yH$; at the same time, the counting period BLHAC of i is self-decreased by one to ensure that the number of bits totally padded in the horizontal arrangement sequence is equal to BLHAC.

If $rmdh_{cnt} yH$, there is no need to additionally pad bits, i.e., no processing is done.

If it is in the case of xh<yh, the calculation method of the horizontal arrangement sequence thereof is similar, i.e., '0' and '1', as well as XH and yH in the above judgment logic are exchanged.

Following Example 1, the process of determining the horizontal arrangement sequence of the horizontal pixel partitions with different widths is described, wherein the arrangement ratio determined according to Formula 9 is 2.75, the arrangement period Th determined according to Formula 10 is 3, the arrangement half period $Th_{half}$ determined according to Formula 11 is 2, and the arrangement remainder rmdh determined according to Formula 12 is 24.

Figure 3:
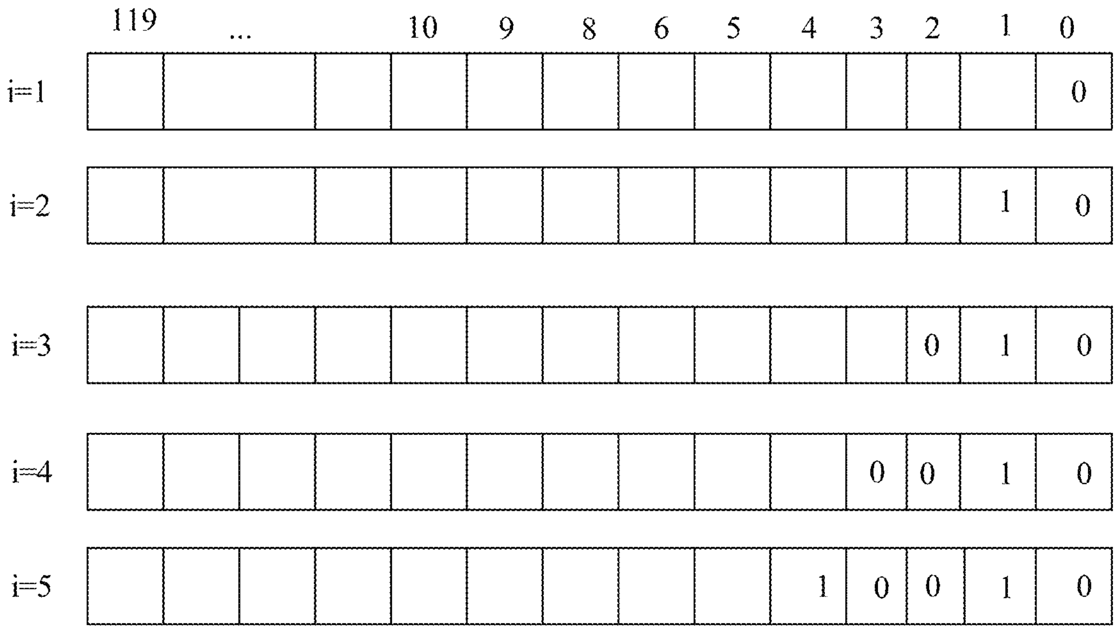
FIG. 3 is a schematic diagram of determining a horizontal arrangement sequence in Example 1 according to an embodiment of the present invention.

FIG. 3 is a schematic diagram of determining the horizontal arrangement sequence in Example 1 according to the embodiment of the present invention, and as shown in FIG. 3, the horizontal arrangement sequence is determined according to the above obtained parameters.

In the case of i=1 and j=0, mod(1,3)=1. Since 1 is not equal to the arrangement half period $Th_{half}$, it belongs to the case of another values, and '0' is padded at the j-th bit (i.e., the 0-th bit in FIG. 3) of the horizontal arrangement sequence SEQH.

In the case of i=2 and j=1, mod(2,3)=2. Since 2 is equal to the arrangement half period $Th_{half}$, in this case, '1' is padded at the j-th bit (i.e., the $1^{st}$ bit in FIG. 3) of the horizontal arrangement sequence SEQH.

In the case of i=3 and j=2, mod(3,3)=0. Since 0 is not equal to the arrangement half period $Th_{half}$, in this case, '0' is padded at the j-th bit (i.e., the $2^{nd}$ bit in FIG. 3) of the horizontal arrangement sequence SEQH.

Since mod(3,3)=0 when i=3 and j=2, in this case the arrangement remainder is accumulated to determine whether there is a need to additionally pad bits. In the case of i=3, the arrangement remainder rmdh is 0.75*32=24, $rmdh_{cnt}=0$, and the arrangement remainder accumulative sum $rmdh_{cnt}=24$ is obtained according to $rmdh_{cnt}=rmdh_{cnt}+rmdh$, and since 24<32, no processing is performed.

In the case of i=4 and j=3, mod(4,3)=1. Since 1 is not equal to the arrangement half period $Th_{half}$, in this case, '0' is padded at the j-th bit (i.e., the $3^{rd}$ bit in FIG. 3) of the horizontal arrangement sequence SEQH.

In the case of i=5 and j=4, mod(5,3)=2. Since 2 is equal to the arrangement half period $Th_{half}$, in this case, '1' is padded at the j-th bit, i.e., the 4th bit, of the horizontal arrangement sequence SEQH.

In the case of i=6 and j=5, mod(6,3)=0. Since 0 is not equal to the arrangement half period $Th_{half}$, in this case, '0' is padded at the j-th bit, i.e., the 5th bit, of the horizontal arrangement sequence SEQH.

Since mod(6,3)=0 when i=6, in this case, the arrangement remainder is accumulated to determine whether there is a need to additionally pad bits. In the case of i=6, the arrangement remainder rmdh is 0.75*32=24, $rmdh_{cnt}=24$ when i=3, and the arrangement remainder accumulative sum $rmdh_{cnt}=48$ is obtained according to $rmdh_{cnt}=rmdh_{cnt}+rmdh$. Since 48>32, '0' is padded at the j+1-th bit, i.e., the 6th bit, of the horizontal arrangement sequence SEQH, and $rmdhh_{cnt}$ is corrected according to $rmdh_{cnt}$ $rmdh_{cnt}-yH$, and the corrected $rmdh_{cnt}=16$.

In the case of i=7 and j=7 . . . and so on, the horizontal arrangement sequence SEQH is obtained.

When the horizontal arrangement sequence SEQH is determined using FPGA by the above method, and subsequently a value of each bit in the horizontal arrangement sequence SEQH is read, an addressing operation will be involved, which operation will occupy a lot of computing resources. In order to reduce computing resources, when the horizontal arrangement sequence SEQH is determined, data is padded from one end of the sequence, that is, data can be padded from the highest bit or the lowest bit, for example, when data is padded from the highest bit, and each padding after the first padding is carried out, the padded sequence is shifted to a lower bit by a unit length (i.e., shifted to the right by 1 bit), so that the latest bit data is padded at the highest bit. Since the actual number of horizontal pixel partitions is not certainly equal to a preset maximum value of the number of horizontal backlight partitions (for example 120), after the padding operation is completed, bit shift sinking is carried out for the padded sequence according to a difference between the number of horizontal pixel partitions and the maximum value of the number of horizontal backlight partitions.

Accordingly, the method of the present invention further includes:

- initializing a sequence with a set length and the sequence number of the horizontal pixel partition;
- if the sequence number of the horizontal pixel partition and the remainder of the arrangement period are equal to the arrangement half period, and the sequence is not padded for the first time, padding 1 at the highest bit of the sequence after the padded sequence is shifted to a lower bit by a unit length;
- if the sequence number of the horizontal pixel partition and the remainder of the arrangement period are not equal to the arrangement half period, and the sequence is not padded for the first time, padding 0 at the highest bit of the sequence after the padded sequence is shifted to the lower bit by the unit length;
- if the sequence number of the horizontal pixel partition and the remainder of the arrangement period are 0, and the sum of the arrangement remainder is greater than the arrangement number of the second horizontal pixel partition in the pixel row, padding 0 at the highest bit of the sequence, and updating the number of horizontal backlight partitions after the padded sequence is shifted to the lower bit by the unit length;
- if the sequence number of the horizontal pixel partition is equal to an updated number of horizontal backlight partitions, shifting the padded valid bit to the lowest bit of the sequence to obtain the horizontal arrangement sequence.

Figure 4A:
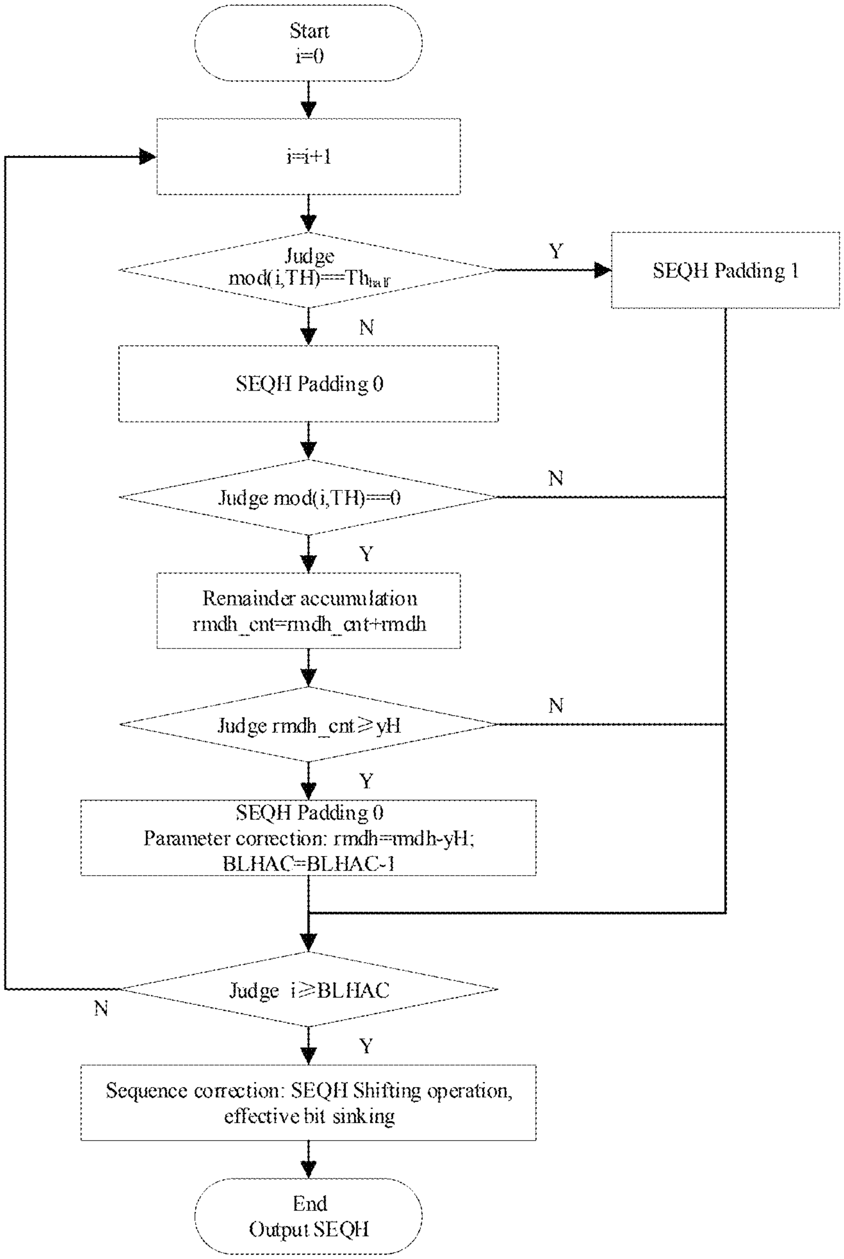
FIG. 4A is a flowchart of determining a horizontal arrangement sequence according to an embodiment of the present invention.

FIG. 4A is a flowchart of determining the horizontal arrangement sequence according to an embodiment of the present invention. As shown in FIG. 4A, in this embodiment, the arrangement of each horizontal pixel partition is calculated by counting i from 1 to BLHAC:

The result of the count i mod Th is judged, and '0' or '1' is selected for sequence padding according to the value of the remainder thereof. For each padding, the previous sequence is shifted to the lower bit by 1 bit, and the highest bit is padded with the latest sequence data.

1. In the case of mod(i,Th)=$Th_{half}$, the highest bit of the horizontal arrangement sequence SEQH is padded with '1'.
2. In the case of mod(i,Th)=other values, the highest bit of the horizontal arrangement sequence SEQH is padded with '0'.
3. In the case of mod(i,Th) other values and mod(i,Th)=0, the arrangement remainder is accumulated to calculate $rmdh_{cnt}$=$rmdh_{cnt}$+rmdh, and it is determined whether there is a need to additionally pad bits according to the value of the arrangement remainder accumulative sum $rmdh_{cnt}$.

If $rmdh_{cnt}\geq yH$, the highest bit of the horizontal arrangement sequence SEQH is padded with '0', and $rmdh_{cnt}$ is corrected according to $rmdh_{cnt}$ $rmdh_{cnt}$=yH, and at the same time, the counting period BLHAC of i is self-decreased by one to ensure that the number of bits totally padded in the horizontal arrangement sequence is equal to the BLHAC.

If $rmdh_{cnt}<yH$, no processing is done.

After counting i is completed, bit shift sinking is performed, shifting the padded valid bits to the lowest bit of the sequence, i.e., the number of shifting $seqh_{shiftcnt}$ is: $seqh_{shiftcnt}$=120-BLHAC.

Figure 4B:
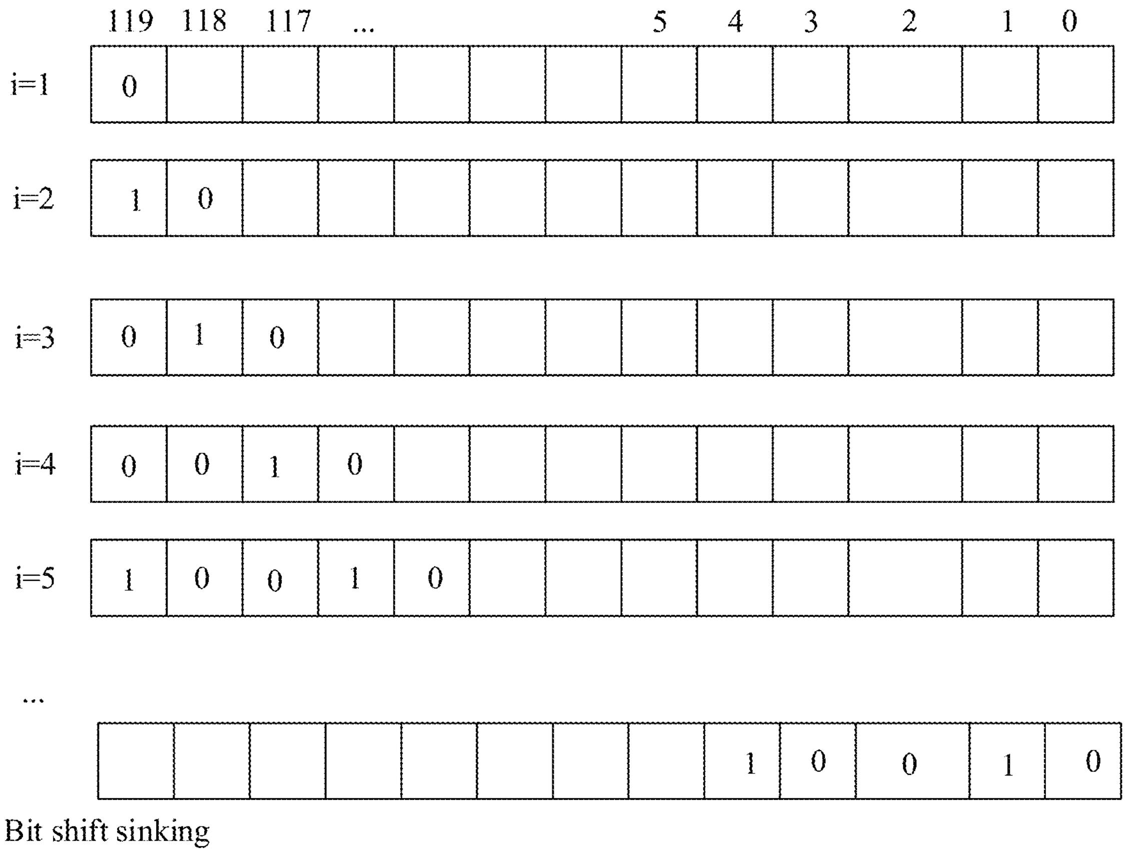
FIG. 4B is a schematic diagram of determining a horizontal arrangement sequence in Example 1 according to an embodiment of the present invention.

FIG. 4B is a schematic diagram of determining the horizontal arrangement sequence in Example 1 according to an embodiment of the present invention, and the horizontal arrangement sequence determined using the method shown in FIG. 3 in Example 1 is shown in FIG. 4B.

In the case of i=1, mod(1,3)=1. Since 1 is not equal to the arrangement half period $Th_{half}$, it belongs to the case of another values, and then '0' is padded at the highest bit of the sequence, i.e., '0' is padded at the 119th bit as shown in FIG. 4B.

In the case of i=2, mod(2,3)=2. Since 2 is equal to the arrangement half period $Th_{half}$ and is not padded for the first time, then '1' is padded at the highest bit of the sequence, i.e., '1' is padded at the 119th bit as shown in FIG. 4B, after the padded sequence is shifted to the right by 1 bit.

In the case of i=3, mod(3,3)=0. Since 0 is not equal to the arrangement half period $Th_{half}$, and is not padded for the first time, then '0' is padded at the highest bit of the sequence, i.e., '0' is padded at the 119th bit as shown in FIG. 4B, after the padded sequence is shifted to the right by 1 bit.

When i=3, although mod(3,3)=0, the arrangement remainder accumulative sum does not satisfy the preset condition, thus there is no need to additionally pad bits.

In a similar fashion, until i is equal to the updated number of horizontal backlight partitions, the padded valid bits are shifted to the lowest bit of the sequence to obtain the horizontal arrangement sequence SEQH. For example, when the number of horizontal backlight partitions is equal to 70, it is needed to shift the padded valid bits to the right by 50 bits to the lowest bit of the sequence.

The above embodiment describes the indivisible case, and in the divisible case, there is only one case of the width of the horizontal pixel partition, and in this case, the length of the horizontal arrangement sequence can be set as the number of horizontal backlight partitions, and all values in the horizontal arrangement sequence are '0' or '1'.

Similarly, the sequence SEQV arrangement direction in the vertical direction can be calculated. Since the calculation principle is the same, it will not be repeated here.

In step 1024, according to the horizontal arrangement sequence and the vertical arrangement sequence, a pixel partition corresponding to each backlight partition in the image to be displayed is determined.

When basic backlight statistics is carried out, it is needed to calculate a mean value of all pixels within each pixel partition, and a division method will be involved in this process. The FPGA needs tens of clock cycle delay for the division method, and the result cannot be obtained in real time, thus the present invention uses an iterative method to convert division into multiplication for calculation, that is, a pixel average value of the pixel partition is determined according to the pixel sum and the division quantization parameter of the pixel partition. Specifically, the pixel average value of the pixel partition can be determined by Formula 13.

$$B\text{avg}=(B\text{sum}*\text{DIVPARAM})\gg\text{DIVBIT} \qquad \text{Formula 13}$$

In Formula 13, Bavg is the pixel average value, Bsum is the pixel sum, DIVPARAM is the division quantization parameter, and DIVBIT is the quantization bit. Said DIVPARAM can be determined according to Formula14.

$$DIVPARAM=\frac{2^{DIVBIT}}{Kh*VDCHNL*Kv} \qquad \text{Formula 14}$$

In the present embodiment, the division quantization parameter can be determined by: acquiring the maximum pixel number of the pixel partition in the horizontal direction and the maximum pixel number of the pixel partition in the vertical direction; determining the quantization bit according to the maximum pixel number in the horizontal direction and the maximum pixel number in the vertical direction; determining the division quantization parameter corresponding to the pixel partition according to the pixel number in the pixel partition and the quantization bit.

In the present embodiment, according to quantization error statistics, the precision can be satisfied if the quantized integer bit is 16 bit, and therefore, the quantization bit can be determined by Formula 16 in the present embodiment.

$$\text{DIVBIT}=\text{bitnum}(Kh*\text{VDCHNL}*Kv)+16 \qquad \text{Formula 16}$$

In Formula 16, DIVBIT is the quantization bit, and bitnum ( ) is the binary bit width operation for acquiring data. In Formula 16, Kh takes the maximum pixel number in the horizontal direction and Kv takes the maximum pixel number in the vertical direction, and taking the pixel partition in Example 1 as an example, Kh takes the maximum pixel number of the pixel partition in the horizontal direction, 5*8=40, and Kv takes the maximum pixel number of the pixel partition in the vertical direction, 26.

In the present invention, a bit width is dynamically calculated by the pixel number in the horizontal and vertical directions of the pixel partition, which can save resources as compared with setting a fixed bit width (the fixed bit width is usually set to be a larger value in order to adapt to different scenes, which will cause waste of resources).

In one embodiment, since the pixel partition can have two widths in both the horizontal direction and the vertical direction, such as Example 1, in this case, different types of pixel partitions can be obtained by a combination of the pixel partition width in the horizontal direction and the pixel partition width in the vertical direction. Herein, a first type of pixel partitions has a first horizontal width and a first vertical width, a second type of pixel partitions has a first horizontal width and a second vertical width, a third type of pixel partitions has a second horizontal width and a first vertical width, and a fourth type of pixel partitions has a second horizontal width and a second vertical width.

Since the pixel number in different types of pixel partitions is different, the division quantization parameters corresponding to different types of pixel partitions are also different. Therefore, said determining the division quantization parameter corresponding to the pixel partition according to the pixel number in the pixel partition and the quantization bit, can include:

- if the type of the pixel partition is the first type, determining a first pixel number in the first type of pixel partitions according to the first horizontal width and the first vertical width, and determining a first division quantization parameter corresponding to the first type of pixel partitions according to the first pixel number and the quantization bit;
- if the type of the pixel partition is the second type, determining a second pixel number in the second type of pixel partitions according to the first horizontal width and the second vertical width, and determining a second division quantization parameter corresponding to the second type of pixel partitions according to the second pixel number and the quantization bit;
- if the type of the pixel partition is the third type, determining a third pixel number in the third type of pixel partitions according to the second horizontal width and the first vertical width, and determining a third division quantization parameter corresponding to the third type of pixel partitions according to the third pixel number and the quantization bit; and
- if the type of the pixel partition is the fourth type, determining a fourth pixel number in the fourth type of pixel partitions according to the second horizontal width and the second vertical width, and determining a fourth division quantization parameter corresponding to the fourth type of pixel partitions according to the fourth pixel number and the quantization bit.

In this embodiment, the division quantization parameter corresponding to different types of pixel partitions can be determined by Formula 17.

$$\begin{cases} DIVPARAM1 = \dfrac{2^{DIVBIT}}{KH1 * VDCHNL * KV1} \\ DIVPARAM2 = \dfrac{2^{DIVBIT}}{KH1 * VDCHNL * KV2} \\ DIVPARAM3 = \dfrac{2^{DIVBIT}}{KH2 * VDCHNL * KV1} \\ DIVPARAM4 = \dfrac{2^{DIVBIT}}{KH2 * VDCHNL * KV2} \end{cases} \qquad \text{Formula 17}$$

In Formula 17, DIVPARAM1 is the division quantization parameter corresponding to the first type of pixel partitions, DIVPARAM2 is the division quantization parameter corresponding to the second type of pixel partitions, DIVPARAM3 is the division quantization parameter corresponding to the third type of pixel partitions, and DIVPARAM4 is the division quantization parameter corresponding to the fourth type of pixel partitions.

In the actual application process, after the derived parameters used in the control process are obtained according to the basic parameters of backlight specification and video specification, the size of each pixel partition and the number of total pixel partitions are dynamically adjusted by the derived parameters, and the basic backlight data and target backlight data of pixel partitions are calculated in real time. The following embodiment will specifically describe the process of calculating the base backlight data and the target backlight data.

In the present embodiment, the maximum pixel value in the pixel partition can be determined by Formula 18.

$$BL\max=\max(P\max(i,j))i\in m,j\in n \qquad \text{Formula 18}$$

$$P\max(i,j)=\max(R(i,j),G(i,j),B(i,j)) \qquad \text{Formula 19}$$

In the above formula, BLmax is the maximum pixel value in the pixel partition, Pmax(i, j) is the maximum pixel value of the i-th row, the j-th column, R(i, j) is the red pixel value of the i-th row, the j-th column, G(i, j) is the green pixel value of the i-th row, the j-th column, B(i, j) is the blue pixel value of the i-th row, the j-th column, m is the pixel number of the pixel partition in the horizontal direction, and n is the pixel number of the pixel partition in the vertical direction.

$$BLavg = \left(\left(\left(\sum_{i=1}^{m}\sum_{j=1}^{n} Pmax(i, j)\right)\right) * DIVPARAM\right) \gg DIVBIT \qquad \text{Formula 20}$$

In Formula 20, BLavg is the pixel average value of the pixel partition, $$\left(\left(\sum_{i=1}^{m}\sum_{j=1}^{n} Pmax(i, j)\right)\right)$$

is the pixel sum in the pixel partition, DIVPARAM is the division quantization parameter, and DIVBIT is the quantization bit.

In the present embodiment, the basic backlight data of the backlight partition corresponding to the pixel partition can be determined by Formula 21.

$$BL=\alpha*BL\text{avg}+(1-\alpha)*BL\max \qquad \text{Formula 21}$$

In Formula 21, BL is the basic backlight data, and α is the weight.

In this embodiment, the basic backlight data of the backlight partition is determined by using an algorithm of weighting the maximum value and the average value, which can adjust the proportion of the maximum value and the average value in the basic backlight data by the weighting coefficient, thereby retaining the advantages of the two algorithms, and also compensate for the shortcomings of the two algorithms to a certain extent.

In the present embodiment, a partition backlight calculation module is responsible for extracting backlight brightness of each pixel partition from the image to be displayed to control the MLED partition backlight to light up. The partition backlight calculation module is divided into two parts: a basic backlight calculation module and a backlight smoothing filter module.

In order to adapt to the basic parameter information varying in real time, the basic backlight calculation module has been improved in counting and storage, which will be introduced separately the following embodiments.

In the aspect of counting, in actual calculation, the size of each pixel partition is not unique, with two widths of KH1 and KH2 in the horizontal direction and two widths of KV1 and KV2 in the vertical direction, and each frame is faced with the update condition of this parameter. Therefore, four counters are needed to identify the partition attribution of the current pixels, and then the partition size of the current pixel partition is obtained from the SEQH and SEQV sequences. Herein, the four counters are a clock number counter in the horizontal pixel partition, a pixel row number counter in the vertical pixel partition, a horizontal pixel partition number counter, and a vertical pixel partition number counter. In this case, the method further includes:

updating the clock number counter in the horizontal pixel partition when a data enable signal is received, and resetting the clock number counter in the horizontal pixel partition when a value corresponding to the clock number counter in the horizontal pixel partition is equal to the width of the horizontal pixel partition;

updating the horizontal pixel partition number counter when the clock number counter in the horizontal pixel partition is reset, and resetting the horizontal pixel partition number counter when a value corresponding to the horizontal pixel partition number counter is equal to the number of horizontal backlight partitions;

updating the pixel row number counter in the vertical pixel partition when the horizontal pixel partition number counter is reset, and resetting the pixel row number counter in the vertical pixel partition when a value corresponding to the pixel row number counter in the vertical pixel partition is equal to a pixel row number in the vertical pixel partition; and updating the vertical pixel partition number counter when the pixel row number counter in the vertical pixel partition is rest, and resetting the vertical pixel partition number counter when a value corresponding to the vertical pixel partition number counter is equal to the number of vertical backlight partitions.

Herein, the data enable signal is referred to as DE (dataenable) signal for short, which is an active data strobe signal, and is also called an active data signal, with many representation symbols, such as dsp, dsptmg, den, de, etc. in a liquid crystal display circuit. The de signal is a signal which is active at a high level, and a video data signal corresponding to when the DE signal is at a high level is considered as an active data signal.

In this embodiment, different counters correspond to different symbols:

Clock number counter in the horizontal pixel partition: $CLK_{hcnt}$,

Pixel row number counter in the vertical pixel partition: $CLK_{vcnt}$,

Horizontal pixel partition number counter: $BLK_{hcnt}$,

Vertical pixel partition number counter: $BLK_{vcnt}$.

In other words, the counting rules are as follows:

①$CLK_{hcnt}$: counting triggered by DE active high level is increased by one; in the case of counting the scanned clock cycles in each row to the width maximum $CLK_{hcnt\_max}$ of the current horizontal pixel partition, the counter $CLK_{hcnt}$ is reset to 1;

②$BLK_{hcnt}$: counting is increased by one when the counting by $CLK_{hcnt}$ is reset; in case of counting the number of the scanned horizontal pixel partitions in each row to the number of horizontal backlight partitions BLHAC, and triggering resetting of the $CLK_{hcnt}$ in the last horizontal pixel partition in the row, the counter $BLK_{hcn}$ is reset to 1;

③$CLK_{vcnt}$: counting is triggered to increase by one when the counting by $BLK_{hcnt}$ is reset; in the case of counting the number of the scanned pixel rows in each frame to the maximum width $CLK_{Vcnt\_max}$ of the current vertical pixel partition, the counter $CLK_{vcnt}$ is reset to 1;

④$BLK_{vcnt}$: counting is triggered to increase by one when the counting by $CLK_{vcnt}$ is reset; when counting the number of the scanned pixel partition rows in each frame to the total number BLVAC of vertical backlight partitions, the counter $BLK_{vcnt}$ is reset to 1;

⑤The maximum value of width of the horizontal pixel partition and the maximum value of width of the vertical pixel partition in the above items 1 and 3 are not unique values, and need to be obtained according to the derivative parameters SEQH and SEQV.

When the SEQH sequence is read, it can be read from a specified end, for example, it can be read from the lowest bit, and when each reading after the first reading is performed, the remaining bits are shifted to a higher bit first, thus avoiding addressing operations and reducing the occupation of computing resources. Specifically including:

If the value of the lowest bit of the current SEQH is '0', the current $CLK_{hcnt}$ Count Max $CLK_{Hcnt\_max}$=KH1;

If the value of the lowest bit of the current SEQH is '1', the current $CLK_{hcnt}$ Count Max $CLK_{Hcnt\_max}$=KH2;

after the parameter calculation module at the beginning of each frame completes the parameter calculation, the SEQH acquires the current latest arrangement sequence; when the counting by $CLK_{hcnt}$ is reset, that is, when the next horizontal pixel partition is switched: the SEQH sequence is shifted to the right by 1 bit.

In the application process, in order to avoid loss of numerical values in the SEQH sequence due to shift after scanning a row, one copy can be cached first and then the above reading process is performed.

Similarly, the judgment logic in the vertical direction is the same as that in the horizontal direction.

Figure 5:
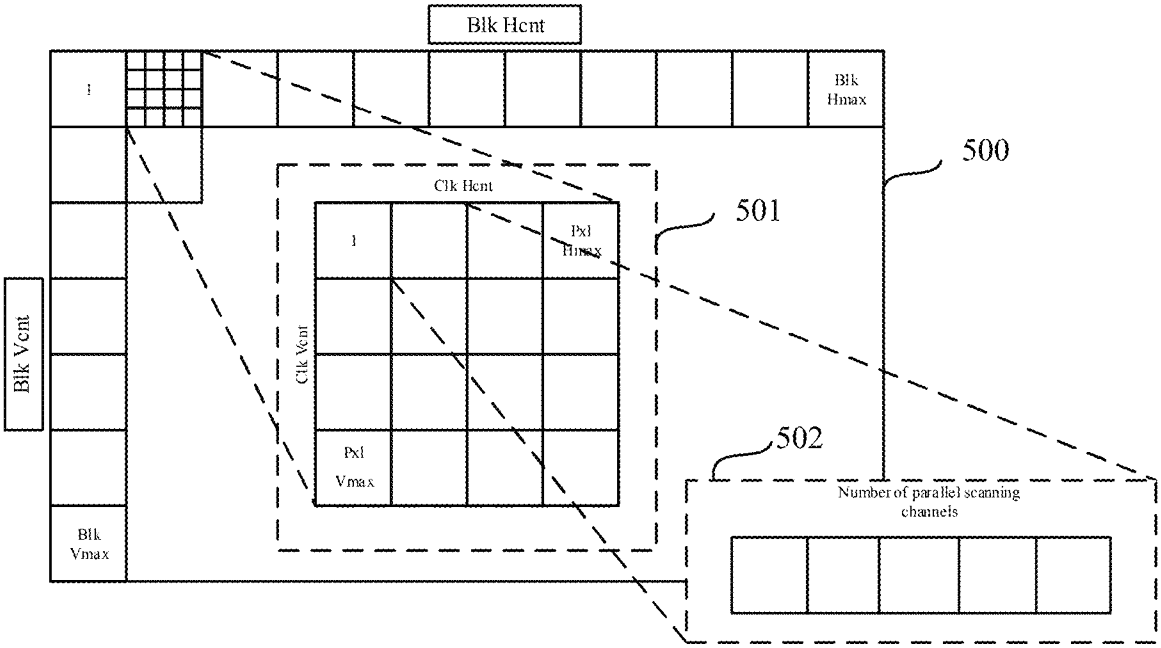
FIG. 5 is a schematic diagram of image and pixel partition division arrangement and counting conditions of four counters according to an embodiment of the present invention.

FIG. 5 is a schematic diagram of image and pixel partition division arrangement and counting conditions of four counters according to an embodiment of the present invention. Within the data validity period, data statistics and calculation are performed by traversing each pixel in each pixel partition in a 'zigzag shape'. As shown in FIG. 5, the image 500 can be divided into a plurality of pixel partitions, and it can be seen from a partial enlargement of the pixel partition 501 that one pixel partition includes a plurality of clock cycles in the horizontal direction and a plurality of pixel rows in the vertical direction. A plurality of pixel columns are included in one clock cycle 502, and eight pixel columns are included in one clock cycle if the number of parallel scanning channels is assumed to be equal to eight.

In terms of storage, data cache storage is needed in the backlight calculation in the basic backlight module mainly because backlight is calculated in pixel partitions, and the transmission of data stream is not transmitted in turn according to each pixel partition. Therefore, an intermediate calculation result of each pixel partition needs to be cached in the process of row scanning calculation, and target backlight data of a pixel partition can only be calculated after all rows and columns of the pixel partition are completely scanned and calculated.

Figure 6:
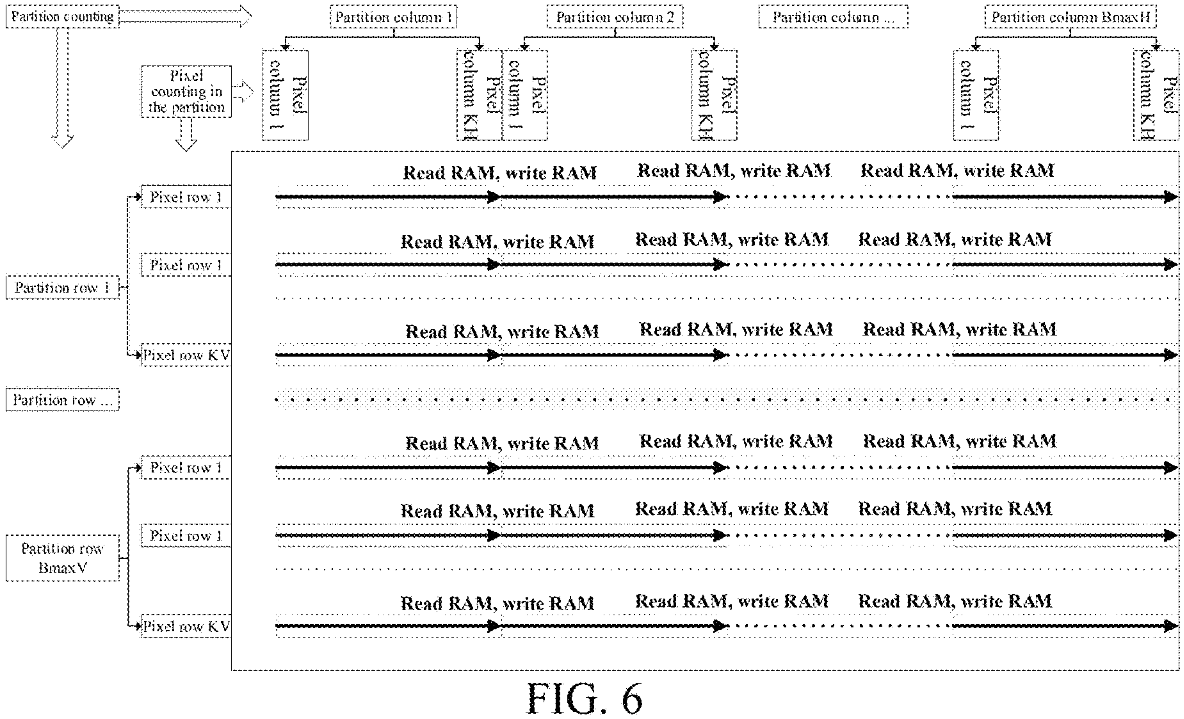
FIG. 6 is a schematic diagram of RAM read/write logic according to an embodiment of the present invention.

In the present invention, the memory RAM instantiates four storage spaces, which are divided into two groups respectively for storing the intermediate calculation results: the maximum value of candidate pixels and the sum of candidate pixels, and two RAMs are instantiated by ping-pong strategy in each group. The purpose of ping-pong strategy is to separate writing backlight data in RAM from the RAM clearing operation. As shown in FIG. 6, when reading/writing of RAM1 is triggered after the backlight partition data is calculated in the current frame, '0' will be written synchronously in RAM2, which can realize the clearing of the backlight data written in the previous frame in all addresses of RAM2, thus eliminating the data residue of the previous frame without causing interference in reading/writing of RAM during the calculation of the backlight partition data of the next frame.

In the video pixel scanning transmission process, the above four counters of $CLK_{hcnt}$, $CLK_{vcnt}$, $BLK_{hcnt}$ and $BLK_{vcnt}$ are used to determine the addresses that the current RAM should read and write. Following Example 1, assume that $CLK_{hcnt}$=2, $CLK_{vcnt}$=3, $BLK_{hcnt}$=45, $BLK_{vcnt}$=5, it is indicated that the current pixel belongs to the pixel partition in the fifth row, the forty-fifth column, and is located in the 2nd clock cycle in the third row of the pixel partition.

The effective storage capacity of RAM is equal to the maximum number of partitions, and each address stores the maximum value of pixels or the sum value of all pixels within each pixel partition. Since a pixel partition row includes a plurality of pixel rows, when the scanning of a pixel partition column is completed in each pixel row, the maximum value of candidate pixels and the sum of candidate pixels of the current pixel row of the current pixel partition can be calculated. For each pixel partition, firstly, the maximum value of candidate pixels and the sum of candidate pixels stored in the RAM of the current pixel partition (i.e., the value determined according to the scanned pixel row of the current pixel partition) are respectively read out, and after the maximum value judgment and accumulation calculation are performed with the current pixel value respectively, the maximum value of candidate pixels and the sum of candidate pixels are updated and stored in the address space of the current pixel partition of the RAM, and then are continued after entering into the next pixel partition of the current row.

In the pixel row scanning process, whether a temporary value calculation is completed in the current pixel row of the current partition is determined according to $CLK_{hcnt}$. The RAM partition read/write address is updated according to $BLK_{hcnt}$ and $BLK_{vcnt}$ to ensure that the temporary row of the current pixel row of the current partition is read out and written in the correct RAM partition address.

After the basic backlight calculation is completed, smoothing filtering can be carried out for the basic backlight data to make the backlight transition more uniform.

Figure 7:
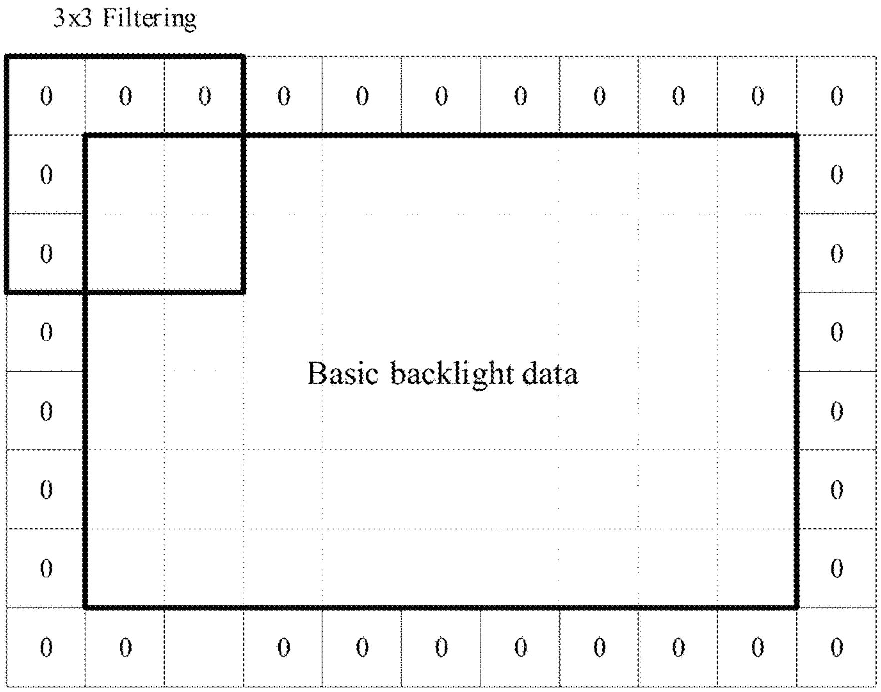
FIG. 7 is a schematic diagram of backlight data storage according to an embodiment of the present invention.

A padding operation can be made for the data before filtering the basic backlight data, and a row or column of '0' can be supplemented to the top, bottom, left and right of a basic backlight data image. The padding operation can be realized by controlling the write RAM address that receives the basic backlight data: instantiating the filtering RAM with the address space of (BLHAC+2) column, (BLVAC+2) row, and writing is carried out from the second row, the second column of the filtering RAM as a starting point when the received basic backlight data is written in the filtering RAM, so as to achieve the padding effect. The storage of the basic backlight data in the filtering RAM is shown in FIG. 7.

After the storage of the basic backlight data is completed, filtering is started from an effective backlight writing address, that is, the second column, the second row is the filtering starting point. The filtering row step and column step are both 1 pixel, each row completes BLHAC times of filtering, and BLVAC rows are executed in total.

In the present invention, 3*3 weighted maximum filtering can be adopted for the backlight filtering, and 3*3 filtering kernel coefficient is as shown in FIG. 8, wherein a center value coefficient is 1, and a peripheral filtering coefficient is β. The filtering kernel coefficient is multiplied by the basic backlight value, and the maximum value is selected from the obtained nine values as an output value of the central area backlight, i.e., target backlight data.

So far, the smoothing filtering of partition backlight is completed, that is, the partition backlight calculation is completed, and the backlight and the image to be displayed can be controlled to be output synchronously.

The control method that is configurable in real time provided by the present invention supports real-time on-line adjustment of backlight partition parameters and video specification parameters, which provides a universal backlight partition dimming method for users, has better compatibility and transplantability, reduces the project development cycle and costs, and provides a technical basis for iterative development of MLED display products.

After the user updates the basic parameter information, the present invention can calculate the derived parameters according to the updated basic parameter information, and adjust the parameters when the backlight data corresponding to the backlight partition is calculated according to the derived parameters, so that the present invention can switch to work normally in a new parameter mode.

The present invention also provides an apparatus for controlling a backlight module, wherein the backlight module includes a plurality of backlight partitions, and the apparatus includes:

an acquisition unit for acquiring a number of horizontal image pixels and a number of vertical image pixels of an image to be displayed, a number of parallel scanning channels, and a number of horizontal backlight partitions and a number of vertical backlight partitions of the backlight module; and a calculation unit for determining a pixel partition corresponding to each backlight partition in the image to be displayed according to the number of horizontal image pixels, the number of vertical image pixels, the number of parallel scanning channels, and a quantitative relationship between the number of horizontal backlight partitions and the number of vertical backlight partitions, and determining backlight data of a backlight partition corresponding to the pixel partition according to the pixel values of various pixels in the pixel partition.

The specific implementation process of the acquisition unit and the calculation unit in the present embodiment has been specifically described in the above embodiments, and will not be repeatedly described here.

The present embodiment may further include a display module, the display module including a display panel and a backlight module. The backlight module is controlled by the method in any one of the above embodiments. The display device of the display module included in the present embodiment may be any product or component with a display function such as electronic paper, a mobile phone, a tablet computer, a television, a notebook computer, a digital photo frame and a navigator.

It should be noted that in the drawings, the dimensions of layers and regions may be exaggerated for clarity of illustration. Also, it can be understood that when an element or layer is referred to as being "on" another element or layer, it may be directly on other element, or there may be an intermediate layer. In addition, it can be understood that when an element or layer is referred to as being "under" another element or layer, it may be directly under other element, or there may be more than one intermediate layer or element. In addition, it can also be understood that when a layer or element is referred to as being "between" two layers or two elements, it may be the only layer between the two layers or the two elements, or there may be more than one intermediate layer or element. Similar reference numerals refer to similar elements throughout the application.

In the present invention, the terms "first" and "second" are used for descriptive purposes only but cannot be understood as indicating or implying relative importance. The term "a plurality of" refers to two or more unless explicitly defined otherwise.

Other embodiments of the present invention will readily conceived by those skilled in the art upon consideration of the specification and practice of the disclosure disclosed herein. The present invention is intended to cover any variations, uses, or adaptations of the present invention, which follow general principles of the present invention and include common sense or conventional technical means in the technical field that are not disclosed in the present invention. The specification and embodiments are to be considered exemplary only and the true scope and spirit of the present disclosure are indicated by the claims.

The invention claimed is:

1. A method for controlling a backlight module, wherein the backlight module comprises a plurality of backlight partitions, the method comprising:

acquiring a number of horizontal image pixels and a number of vertical image pixels of an image to be displayed, a number of parallel scanning channels, and a number of horizontal backlight partitions and a number of vertical backlight partitions of the backlight module;

determining a pixel partition corresponding to each backlight partition in the image to be displayed according to the number of horizontal image pixels, the number of vertical image pixels, the number of parallel scanning channels, and a quantitative relationship between the number of horizontal backlight partitions and the number of vertical backlight partitions;

determining backlight data of a backlight partition corresponding to the pixel partition according to pixel values of various pixels in the pixel partition.

2. The method of claim 1, wherein the pixel partition is determined according to a horizontal pixel partition and a vertical pixel partition;

said determining the pixel partition corresponding to each backlight partition in the image to be displayed according to the number of horizontal image pixels, the number of vertical image pixels, the number of parallel scanning channels, and the quantitative relationship between the number of horizontal backlight partitions and the number of vertical backlight partitions, comprises:

determining a width of the horizontal pixel partition according to a multiple relationship between the number of horizontal image pixels as well as the number of parallel scanning channels and the number of horizontal backlight partitions, and determining a width of the vertical pixel partition according to a multiple relationship between the number of vertical image pixels and the number of vertical backlight partitions;

determining an arrangement number of horizontal pixel partitions with different widths in a pixel row according to the number of horizontal image pixels, the number of parallel scanning channels, and the number of horizontal backlight partitions, and determining an arrangement number of vertical pixel partitions with different widths in a pixel column according to the number of vertical image pixels and the number of vertical backlight partitions;

determining a horizontal arrangement sequence of the horizontal pixel partitions with different widths and a vertical arrangement sequence of the vertical pixel partitions with different widths; and determining the pixel partition corresponding to each backlight partition in the image to be displayed according to the horizontal arrangement sequence and the vertical arrangement sequence.

3. The method of claim 2, wherein said determining the width of the horizontal pixel partition according to the multiple relationship between the number of horizontal image pixels as well as the number of parallel scanning channels and the number of horizontal backlight partitions, and determining the width of the vertical pixel partition according to the multiple relationship between the number of vertical image pixels and the number of vertical backlight partitions, comprises:

if there is a non-integer multiple between the number of horizontal image pixels as well as the number of parallel scanning channels and the number of horizontal backlight partitions, determining a first horizontal width and a second horizontal width of the horizontal pixel partition using a rounding function according to the number of horizontal image pixels, the number of parallel scanning channels and the number of horizontal backlight partitions, wherein the first horizontal width and the second horizontal width are an integer number of clock cycles, and a difference between the first horizontal width and the second horizontal width is one clock cycle;

if there is an integer multiple between the number of horizontal image pixels as well as the number of parallel scanning channels and the number of horizontal backlight partitions, determining a third horizontal width of the horizontal pixel partition according to the number of horizontal image pixels, the number of parallel scanning channels, and the number of horizontal backlight partitions, wherein the third horizontal width is an integer number of clock cycles;

if there is a non-integer multiple between the number of vertical image pixels and the number of vertical backlight partitions, determining a first vertical width and a second vertical width of the vertical pixel partition using the rounding function according to the number of vertical image pixels and the number of vertical backlight partitions; and if there is an integer multiple between the number of vertical image pixels and the number of vertical backlight partitions, determining a third vertical width of the vertical pixel partition according to the number of vertical image pixels and the number of vertical backlight partitions.

4. The method of claim 3, wherein said determining the first horizontal width and the second horizontal width of the horizontal pixel partition using the rounding function according to the number of horizontal image pixels, the number of parallel scanning channels, and the number of horizontal backlight partitions, comprises:

determining a number of scanning times in a horizontal image direction according to the multiple relationship between the number of horizontal image pixels and the number of parallel scanning channels;

determining the first horizontal width of the horizontal pixel partition using a downward rounding function according to the number of scanning times in the horizontal image direction and the number of horizontal backlight partitions; and determining the second horizontal width of the horizontal pixel partition using an upward rounding function according to the number of scanning times in the horizontal image direction and the number of horizontal backlight partitions;

said determining the first vertical width and the second vertical width of the vertical pixel partition using the rounding function according to the number of vertical image pixels and the number of vertical backlight partitions, comprises:

determining the first vertical width of the vertical pixel partition using the downward rounding function according to the number of vertical image pixels and the number of vertical backlight partitions; and determining the second vertical width of the vertical pixel partition using the upward rounding function according to the number of vertical image pixels and the number of vertical backlight partitions.

5. The method of claim 2, wherein the horizontal pixel partition comprises a first horizontal pixel partition and a second horizontal pixel partition, a width of the first horizontal pixel partition is a first horizontal width, and a width of the second horizontal pixel partition is a second horizontal width;

said determining the arrangement number of the horizontal pixel partitions with different widths in the pixel row according to the number of horizontal image pixels, the number of parallel scanning channels and the number of horizontal backlight partitions, comprises:

determining a difference between a number of scanning times in a horizontal image direction and a product of the second horizontal width and the number of horizontal backlight partitions, as an arrangement number of the first horizontal pixel partition in the pixel row, wherein the number of scanning times in the horizontal image direction is determined according to the number of horizontal image pixels and the number of parallel scanning channels; and determining a difference between the number of horizontal backlight partitions and a product of the number of scanning times in the horizontal image direction and the first horizontal width, as an arrangement number of the second horizontal pixel partition in the pixel row.

6. The method of claim 2, wherein the vertical pixel partition comprises a first vertical pixel partition and a second vertical pixel partition, a width of the first vertical pixel partition is a first vertical width and a width of the second vertical pixel partition is a second vertical width;

said determining the arrangement number of the vertical pixel partitions with different widths in the pixel column according to the number of vertical image pixels and the number of vertical backlight partitions, comprises:

determining a difference between the number of vertical image pixels and a product of the second vertical width and the number of vertical backlight partitions, as an arrangement number of the first vertical pixel partition in the pixel column; and determining a difference between the number of vertical image pixels and a product of the first vertical width and the number of vertical backlight partitions, as an arrangement number of the second vertical pixel partition in the pixel column.

7. The method of claim 2, wherein the horizontal pixel partition comprises a first horizontal pixel partition and a second horizontal pixel partition, the first horizontal pixel partition and the second horizontal pixel partition having different widths;

said determining the horizontal arrangement sequence of the horizontal pixel partitions with different widths comprises:

determining an arrangement ratio according to a ratio of an arrangement number of the first horizontal pixel partition in the pixel row and an arrangement number of the second horizontal pixel partition in the pixel row;

rounding down the arrangement ratio and then adding to a unit clock cycle to obtain an arrangement period;

if the arrangement period is not equal to a set period, rounding down half of the arrangement ratio and then adding to the unit clock cycle to obtain an arrangement half period, and if the arrangement period is equal to the set period, determining the unit clock cycle as the arrangement half period;

utilizing the arrangement number of the first horizontal pixel partition in the pixel row to subtract a product of the arrangement ratio rounded down and the arrangement number of the second horizontal pixel partition in the pixel row to obtain an arrangement remainder; and for each horizontal pixel partition, determining a position where a sequence number of a current horizontal pixel partition is located to arrange the first horizontal pixel partition or the second horizontal pixel partition according to a relationship between a sequence number of the horizontal pixel partition as well as a remainder of the arrangement period and the arrangement half period, and when a set condition is satisfied, arranging the first horizontal pixel partition at a position where a sequence number of a next horizontal pixel partition is located, wherein the set condition comprises that the sequence number of the horizontal pixel partition and the remainder of the arrangement period are zero, and a sum of the arrangement remainder is greater than the arrangement number of the second horizontal pixel partition in the pixel row.

8. The method of claim 7, wherein said determining the position where the sequence number of the current horizontal pixel partition is located to arrange the first horizontal pixel partition or the second horizontal pixel partition according to the relationship between the sequence number of the horizontal pixel partition as well as the remainder of the arrangement period and the arrangement half period, comprises:

if the sequence number of the horizontal pixel partition and the remainder of the arrangement period are equal to the arrangement half period, determining the position where the horizontal pixel partition is located to arrange the second horizontal pixel partition; and if the sequence number of the horizontal pixel partition and the remainder of the arrangement period are not equal to the arrangement half period, determining the position where the horizontal pixel partition is located to arrange the first horizontal pixel partition.

9. The method of claim 8, wherein 0 is used to identify the first horizontal pixel partition and 1 is used to identify the second horizontal pixel partition in the horizontal arrangement sequence, the method further comprising:

initializing a sequence with a set length and the sequence number of the horizontal pixel partition;

if the sequence number of the horizontal pixel partition and the remainder of the arrangement period are equal to the arrangement half period, and the sequence is not padded for first time, padding 1 at a highest bit of the sequence after the padded sequence is shifted to a lower bit by a unit length;

if the sequence number of the horizontal pixel partition and the remainder of the arrangement period are not equal to the arrangement half period, and the sequence is not padded for first time, padding 0 at the highest bit of the sequence after the padded sequence is shifted to the lower bit by the unit length;

if the sequence number of the horizontal pixel partition and the remainder of the arrangement period are 0, and the sum of the arrangement remainder is greater than the arrangement number of the second horizontal pixel partition in the pixel row, padding 0 at the highest bit of the sequence, and updating the number of horizontal backlight partitions after the padded sequence is shifted to the lower bit by the unit length; and if the sequence number of the horizontal pixel partition is equal to an updated number of horizontal backlight partitions, shifting the padded valid bit to a lowest bit of the sequence to obtain the horizontal arrangement sequence.

10. The method of claim 1, wherein said determining the backlight data of the backlight partition corresponding to the pixel partition according to the pixel values of various pixels in the pixel partition, comprises:

obtaining a maximum pixel value and a pixel sum in the pixel partition according to the pixel values of various pixels in the pixel partition;

determining a pixel average value according to a division quantization parameter of the pixel partition and the pixel sum;

determining basic backlight data of the backlight partition corresponding to the pixel partition according to the maximum pixel value and the pixel average value and respective weights; and filtering basic backlight data corresponding to all backlight partitions to obtain target backlight data of each backlight partition.

11. The method of claim 10, wherein the division quantization parameter is determined by:

acquiring a maximum pixel number of the pixel partition in a horizontal direction and a maximum pixel number of the pixel partition in a vertical direction, wherein the maximum pixel number in the horizontal direction is determined according to a width of the pixel partition in the horizontal direction and the number of parallel scanning channels;

determining a quantization bit according to the maximum pixel number in the horizontal direction and the maximum pixel number in the vertical direction; and determining a division quantization parameter corresponding to the pixel partition according to the pixel number in the pixel partition and the quantization bit.

12. The method of claim 11, wherein the pixel partition comprises different types of pixel partitions, wherein a first type of pixel partitions has a first horizontal width and a first vertical width, a second type of pixel partitions has a first horizontal width and a second vertical width, a third type of pixel partitions has a second horizontal width and a first vertical width, and a fourth type of pixel partitions has a second horizontal width and a second vertical width;

said determining the division quantization parameter corresponding to the pixel partition according to the pixel number in the pixel partition and the quantization bit, comprises:

if the type of the pixel partitions is the first type, determining a first pixel number in the first type of pixel partitions according to the first horizontal width and the first vertical width, and determining a first division quantization parameter corresponding to the first type of pixel partitions according to the first pixel number and the quantization bit;

if the type of the pixel partitions is the second type, determining a second pixel number in the second type of pixel partitions according to the first horizontal width and the second vertical width, and determining a second division quantization parameter corresponding to the second type of pixel partitions according to the second pixel number and the quantization bit;

if the type of the pixel partitions is the third type, determining a third pixel number in the third type of pixel partitions according to the second horizontal width and the first vertical width, and determining a third division quantization parameter corresponding to the third type of pixel partitions according to the third pixel number and the quantization bit; and if the type of the pixel partitions is the fourth type, determining a fourth pixel number in the fourth type of pixel partitions according to the second horizontal width and the second vertical width, and determining a fourth division quantization parameter corresponding to the fourth type of pixel partitions according to the fourth pixel number and the quantization bit.

13. The method of claim 10, wherein each pixel in the pixel partition corresponds to a plurality of counters, the plurality of counters comprising: a clock number counter in the horizontal pixel partition, a pixel row number counter in the vertical pixel partition, a horizontal pixel partition number counter, and a vertical pixel partition number counter; the method further comprises:

updating the clock number counter in the horizontal pixel partition when a data enable signal is received, and resetting the clock number counter in the horizontal pixel partition when a value corresponding to the clock number counter in the horizontal pixel partition is equal to the width of the horizontal pixel partition;

updating the horizontal pixel partition number counter when the clock number counter in the horizontal pixel partition is reset, and resetting the horizontal pixel partition number counter when a value corresponding to the horizontal pixel partition number counter is equal to the number of horizontal backlight partitions;

updating the pixel row number counter in the vertical pixel partition when the horizontal pixel partition number counter is reset, and resetting the pixel row number counter in the vertical pixel partition when a value corresponding to the pixel row number counter in the vertical pixel partition is equal to a pixel row number in the vertical pixel partition; and updating the vertical pixel partition number counter when the pixel row number counter in the vertical pixel partition is rest, and resetting the vertical pixel partition number counter when a value corresponding to the vertical pixel partition number counter is equal to the number of vertical backlight partitions.

14. The method of claim 13, wherein the width of the horizontal pixel partition is determined by:

obtaining a lowest bit of a horizontal arrangement sequence;

if a value corresponding to the lowest bit is 0, the width of the horizontal pixel partition is a first horizontal width;

if the value corresponding to the lowest bit is 1, the width of the horizontal pixel partition is a second horizontal width;

when the clock number counter in the horizontal pixel partition is reset, the horizontal arrangement sequence is shifted to right by 1 bit.

15. The method of claim 13, wherein said obtaining the maximum pixel value and the pixel sum in the pixel partition according to the pixel values of various pixels in the pixel partition, comprises:

in a process of scanning the image to be displayed, determining a target pixel partition to which a currently scanned pixel belongs according to the horizontal pixel partition number counter and the vertical pixel partition number counter corresponding to the currently scanned pixel;

obtaining a candidate maximum pixel value and a candidate pixel sum from a storage area corresponding to the target pixel partition;

if a pixel value corresponding to the currently scanned pixel is greater than the candidate maximum pixel value, updating the candidate maximum pixel value as the pixel value corresponding to the currently scanned pixel; and updating the candidate pixel sum with the pixel value corresponding to the currently scanned pixel.

16. The method of claim 10, wherein said filtering the basic backlight data corresponding to all backlight partitions to obtain the target backlight data of each backlight partition, comprises:

performing a padding operation on the basic backlight data corresponding to all backlight partitions; and filtering the basic backlight data after the padding operation using a preset filtering kernel to obtain target backlight data of each backlight partition, wherein a number of filtering times of each row of basic backlight data is determined according to the number of horizontal backlight partitions, and a number of rows where filtering is executed is determined according to the number of vertical backlight partitions.

17. The method of claim 1, wherein the method further comprises:

caching the image to be displayed to a video frame buffer device; and controlling the backlight data of all backlight partitions to be output synchronously with the image to be displayed when the backlight data of all backlight partitions is acquired.

18. An apparatus for controlling a backlight module, wherein the backlight module comprises a plurality of backlight partitions, the apparatus comprising:

an acquisition unit for acquiring a number of horizontal image pixels and a number of vertical image pixels of an image to be displayed, a number of parallel scanning channels, and a number of horizontal backlight partitions and a number of vertical backlight partitions of the backlight module; and a calculation unit for determining a pixel partition corresponding to each backlight partition in the image to be displayed according to the number of horizontal image pixels, the number of vertical image pixels, the number of parallel scanning channels, and a quantitative relationship between the number of horizontal backlight partitions and the number of vertical backlight partitions, and determining backlight data of a backlight partition corresponding to the pixel partition according to pixel values of various pixels in the pixel partition.

19. A display module, comprising:

a display panel and a backlight module;

the backlight module being controlled by the method of claim 1.

* * * * *